(12) United States Patent
Lin et al.

(10) Patent No.: US 10,572,929 B2
(45) Date of Patent: Feb. 25, 2020

(54) DECISION FACTORS ANALYZING DEVICE AND DECISION FACTORS ANALYZING METHOD

(71) Applicant: Industrial Technology Research Institute, Hsinchu (TW)

(72) Inventors: Cheng-Liang Lin, Kaohsiung (TW); Jie-Sin Li, New Taipei (TW); En-Tzu Wang, Kaohsiung (TW); Jyun-Tang Huang, Taoyuan (TW); Tsung-Wen Tso, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 262 days.

(21) Appl. No.: 15/853,866

(22) Filed: Dec. 25, 2017

(65) Prior Publication Data

US 2019/0164213 A1 May 30, 2019

(30) Foreign Application Priority Data

Nov. 24, 2017 (TW) .............................. 106141043 A

(51) Int. Cl.
*G06Q 30/00* (2012.01)
*G06Q 30/06* (2012.01)
(Continued)

(52) U.S. Cl.
CPC ... *G06Q 30/0631* (2013.01); *G06F 16/24578* (2019.01); *G06F 17/18* (2013.01); *G06N 5/04* (2013.01); *G06Q 30/0201* (2013.01)

(58) Field of Classification Search
None
See application file for complete search history.

(56) References Cited

U.S. PATENT DOCUMENTS

| 6,321,221 B1 | 11/2001 | Bieganski |
| 7,561,158 B2 | 7/2009 | Abe et al. |

(Continued)

FOREIGN PATENT DOCUMENTS

| CN | 104866474 | 8/2015 |
| CN | 105760474 | 7/2016 |

(Continued)

OTHER PUBLICATIONS

"Office Action of Taiwan Counterpart Application", dated Apr. 18, 2018, p. 1-p. 12, in which the listed references were cited.

(Continued)

*Primary Examiner* — Mila Airapetian
(74) *Attorney, Agent, or Firm* — JCIPRNET

(57) ABSTRACT

A decision factors analyzing device and a decision factors analyzing device for analyzing a plurality of decision factors which cause a product of a product type to be purchased are provided. The method includes identifying a plurality of product sequences corresponding to the product type from a plurality of browse history data and a plurality of purchase history data corresponding to a plurality of consumers of a consumer database, wherein each of the product sequences includes a unpurchased product and a purchased product; obtaining a feature sequence according to the produce sequences and a plurality of product information; training a regression model corresponding to the product type according to K decision factors of the feature sequence to obtain an optimized regression model, and obtaining K decision values respectively corresponding to the K decision factors according to the optimized regression model to generate a decision factor sequence corresponding to the product type.

30 Claims, 12 Drawing Sheets

(51) Int. Cl.
*G06Q 30/02* (2012.01)
*G06F 17/18* (2006.01)
*G06N 5/04* (2006.01)
*G06F 16/2457* (2019.01)

(56) References Cited

U.S. PATENT DOCUMENTS

| | | | |
|---|---|---|---|
| 7,853,599 | B2 | 12/2010 | Liu et al. |
| 9,911,130 | B1* | 3/2018 | Battisti .............. G06Q 30/0201 |
| 2003/0220834 | A1 | 11/2003 | Leung et al. |
| 2004/0220834 | A1* | 11/2004 | Pellinat .................. G06Q 10/10 705/2 |
| 2011/0106594 | A1 | 5/2011 | Shirey |
| 2015/0073931 | A1 | 3/2015 | Ronen et al. |
| 2015/0081469 | A1 | 3/2015 | Acharyya et al. |
| 2016/0217513 | A1 | 7/2016 | Moghaddam et al. |
| 2016/0284007 | A1 | 9/2016 | Sakai |
| 2018/0218436 | A1* | 8/2018 | Cooper .............. G06Q 30/0631 |

FOREIGN PATENT DOCUMENTS

| | | |
|---|---|---|
| CN | 106447463 | 2/2017 |
| CN | 106485562 | 3/2017 |
| CN | 105243392 | 6/2017 |
| CN | 101427273 | 10/2017 |
| CN | 107230133 | 10/2017 |
| TW | 200731149 | 8/2007 |
| TW | I433042 | 4/2014 |
| TW | I554895 | 10/2016 |
| TW | I591556 | 7/2017 |
| WO | 2017100464 | 6/2017 |

OTHER PUBLICATIONS

Ranjeet Singh et al.,"Product Aspect Ranking, Sentiment Analysis and Classification of Product Reviews on E-Commerce Sites—A Review", Journal of Network Communications and Emerging Technologies (JNCET), vol. 6, Issue 5, May 2016, pp. 80-83.

Zheng-Jun Zha et al.,"Product Aspect Ranking and Its Applications", IEEE Transactions on Knowledge and Data Engineering, vol. 26, No. 5, May 2004, pp. 1211-1224.

P. Kanchana Devi et al.,"Ranking Features of the Products Based on the Customer Opinion",International Journal of Computer Technology and Applications(IJCTA), vol. 8, No. 5, 2015, pp. 1981-1988.

Harsha Patil et al.,"Product Review Sentiment Analysis with Aspect Ranking",International Journal of Science and Research (IJSR), vol. 5, Issue 9, Sep. 2016, pp. 749-752.

Tao Wang et al.,"Product aspect extraction supervised with online domain knowledge", Knowledge-Based Systems , vol. 71, Issue 1, Nov. 2014, pp. 86-100.

\* cited by examiner

A plurality of product sequences of the product type

| Product sequence | Browsed products |
|---|---|
| PS1 | Unpurchased product PA, unpurchased product PB and purchased product PC |
| PS2 | Unpurchased product PD and purchased product PE |
| ... | |

FIG. 3B

Replacement sheets

Feature transformation

DECISION FACTORS ANALYZING DEVICE AND DECISION FACTORS ANALYZING METHOD

CROSS-REFERENCE TO RELATED APPLICATION

This application claims the priority benefit of Taiwan application serial no. 106141043, filed on Nov. 24, 2017. The entirety of the above-mentioned patent application is hereby incorporated by reference herein and made a part of this specification.

TECHNICAL FIELD

The disclosure relates to a decision factors analyzing device and a decision factors analyzing method.

BACKGROUND

With progress of technology, wide development of networks and evolution of shipping channels, shopping behaviors of modern people have also changed from shopping in physical stores to shopping from E-commerce websites. In other words, internet shopping has become a trend.

For sellers (or relevant product managers) who sell goods through E-commerce websites, they may determine which products are best-selling according to statistical information/historic records provided by the E-commerce websites. However, it is not easy for the sellers to determine factors which cause the best-selling products to be so well sold according to the statistical information/historic records, which leads difficulty to the sellers in further improving purchased rates of the products vended in the E-commerce websites, i.e., the sellers are unable to experience full benefits from selling products using the E-commerce websites. For example, it is not easy for the sellers to, according to the statistical information/historic records provided by the E-commerce websites, effectively recognize the products (and specifications thereof) with higher purchase rates or recognize designing features/specifications of webpages capable of attracting people to purchase the products.

Accordingly, how to utilize the statistical information/historic records provided by the E-commerce websites to analyze the decision factors that cause the products to be purchased for the sellers to recognize the products with higher purchase rates or design webpages that attract more buyers is a goal that people in this field make effort to achieve.

SUMMARY

The disclosure introduces a decision factors analyzing device and a decision factors analyzing method capable of analyzing a plurality of decision factors which influence whether products corresponding to a product type are purchased.

According to an embodiment of the disclosure, a decision factors analyzing device for analyzing a plurality of decision factors which cause products corresponding to a product type to be purchased is provided. The decision factors analyzing device includes a communication circuit unit, a storage device and a processor. The communication circuit unit is configured to connect with an E-commerce server of an E-commerce website. The storage device is configured to store a plurality of code modules. The processor is configured to access and execute the code modules to perform a decision factors analyzing operation corresponding to the product type. The code modules include a data extraction module, a decision factors management module and a regression model management module. The data extraction module is configured to read a plurality of consumer history data respectively corresponding to a plurality of consumers from a consumer database of the E-commerce server and read a plurality of product information data from a product information database of the E-commerce server. Each of the consumer history data includes browse history data and purchase history data. The decision factors management module is configured to manage the decision factors analyzing operation. The regression model management module is configured to train the regression model. The decision factors management module instructs the data extraction module to recognize a plurality of product sequences corresponding to the product type from the browse history data and the purchase history data corresponding to the consumers according to the product type. Each of the product sequences includes a plurality of browsed products belonging to the product type and respectively corresponding to the consumers. The browsed products include one or more unpurchased products and a purchased product. In addition, the decision factors management module obtains a plurality of feature groups respectively corresponding to the product sequences according to the one or more unpurchased products and the purchased product of each of the product sequences. Each of the feature groups includes a plurality of features and a plurality of feature values respectively corresponding to the features. The decision factors management module further obtains feature sequence according to the product sequences and the feature groups corresponding to the product type. The decision factors management module selects former K features among the sorted features in the feature sequence as K decision factors. The regression model management module trains the regression model corresponding to the product type according to the K decision factors and the product information data to obtain an optimized regression model and obtains K decision values respectively corresponding to the K decision factors according to the optimized regression model. The decision factors management module sorts the K decision factors in a descending order according to the K decision values to generate a decision factor sequence having the K decision factors corresponding to the product type. The decision factors management module determines a first decision factor which is foremost sorted among the K decision factors in the decision factor sequence corresponding to the product type as key product information which mainly influences whether products of the product type are purchased.

According to an embodiment, a decision factors analyzing method for analyzing a plurality of decision factors which cause products corresponding to a product type to be purchased is provided. The method includes reading a plurality of consumer history data respectively corresponding to a plurality of consumers from a consumer database of an E-commerce server of an E-commerce website and reading a plurality of product information data from a product information database of the E-commerce server, wherein each of the consumer history data includes browse history data and purchase history data; recognizing a plurality of product sequences corresponding to the product type from the browse history data and the purchase history data corresponding to the consumers according to the product type, wherein each of the product sequences includes a plurality of browsed products belonging to the product type and respectively corresponding to the consumers, and the browsed products includes one or more unpurchased products and a purchased product; obtaining a plurality of feature groups respectively corresponding to the product sequences according to the one or more unpurchased products and the purchased product of each of the product sequences, wherein each of the feature groups includes a plurality of features and a plurality of feature values respectively corresponding to the features; obtaining a feature sequence according to the product sequences corresponding to the product type and the feature groups; selecting former K features among the features in the feature sequence as K decision factors; training a regression model corresponding to the product type according to the K decision factors and the product information data to obtain an optimized regression model, and obtaining K decision values respectively corresponding to the K decision factors according to the optimized regression model; and sorting the K decision factors in a descending order according to the K decision values to generate a decision factor sequence having the K decision factors corresponding to the product type, wherein a first decision factor which is foremost sorted among the K decision factors in the decision factor sequence corresponding to the product type is determined as key product information which mainly influences whether products of the product type are purchased.

Based on the above, in the decision factors analyzing device and the decision factors analyzing method provided by the embodiments of the disclosure, a plurality of product sequences corresponding to a specific product type can be recognized according to a plurality of browse history records and a plurality of purchase history records, which are corresponding to the specific product type, of a plurality of consumers of the E-commerce website, and a plurality of decision factors which influence whether the products of the specific product type are purchased are analyzed according to a regression model and a plurality of product information corresponding to the unpurchased and purchased products in the product sequences, such that corresponding reference information can be provided for designing products of the specific product type to attract buyers.

Several exemplary embodiments accompanied with figures are described in detail below to further describe the disclosure in detail.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 3B illustrates a plurality of recognized product sequences according to an embodiment of the disclosure.

DETAILED DESCRIPTION OF DISCLOSED EMBODIMENTS

Figure 1:
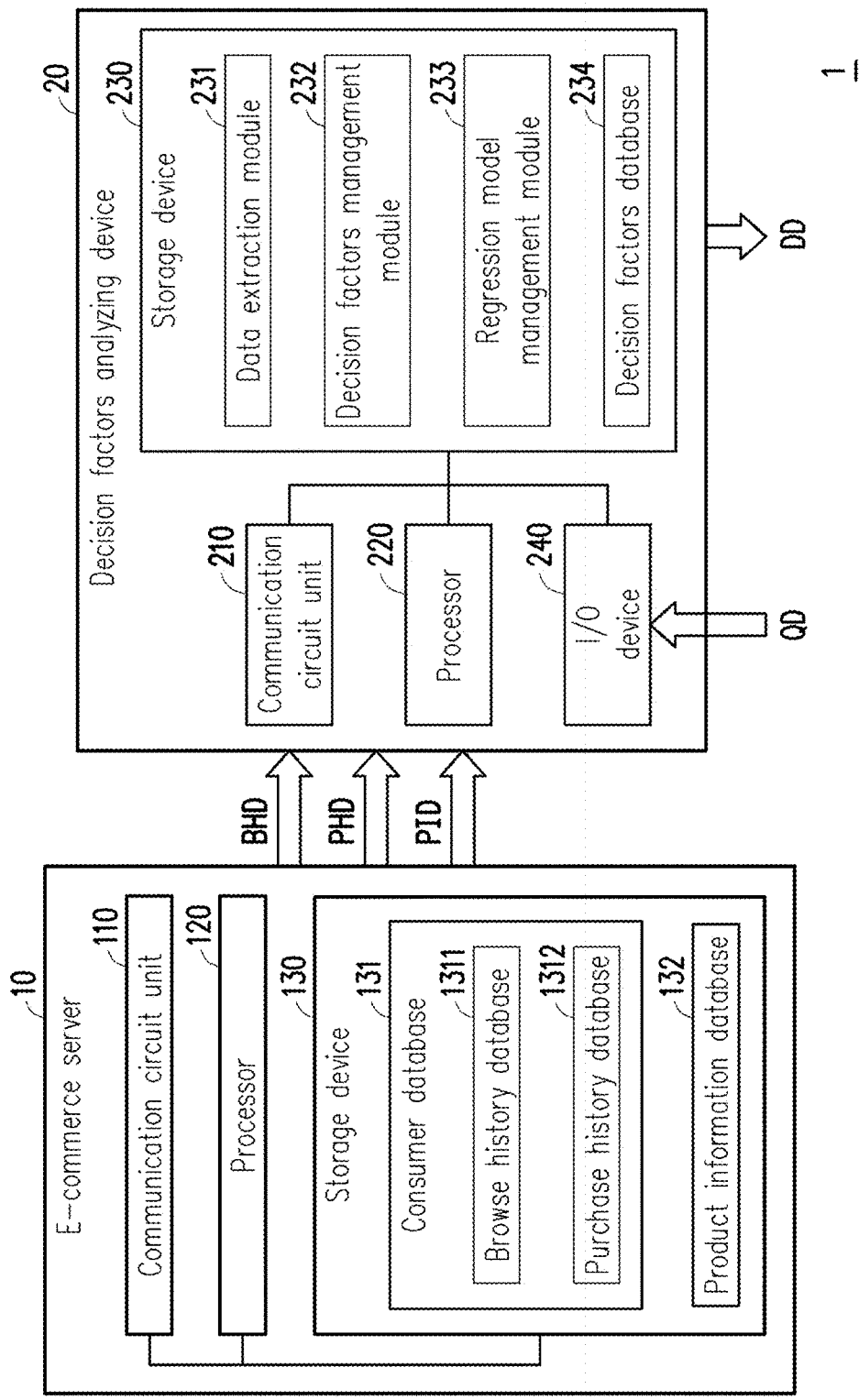
FIG. 1 is a schematic block diagram illustrating a decision factors analyzing system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

The main spirit of a decision factors analyzing system (device) and a decision factors analyzing method provided by the disclosure is: mining information for availability by using statistic data/history data provided by an E-commerce website to find out key product features (including specifications of the products and specifications of webpages for displaying the products) of products of a product type which attracts consumers to purchase. In other words, the decision factors analyzing system (device) and the decision factors analyzing method provided by the disclosure may analyze a plurality of decision factors of a specific product type corresponding to an E-commerce website according to product information data and history data of the E-commerce website, such that relevant persons can further utilize the analyzed decision factors for designing product specifications and webpage specifications of products corresponding to the specific product type for sale. In this way, the relevant persons who sell the products accordingly can further suspend (stop selling) products with lower (predicted) purchase rates (or suspend products having less features for attracting purchase), increasingly launch (start to sell) products with higher (predicted) purchase rates (or launch products having more features for attracting purchase), and modify marketing strategies and logistics systems toward the specific product types.

FIG. 1 is a schematic block diagram illustrating a decision factors analyzing system according to an embodiment of the disclosure. Referring to FIG. 1, in the present embodiment, a decision factors analyzing system 1 includes an E-commerce server 10 of an E-commerce website and a decision factors analyzing device 20. The E-commerce server 10 and the decision factors analyzing device 20 may be connected through the Internet, a local network or a wireless network. The E-commerce website may refer to any website selling physical goods, for example, Amazon, Taobao, Shopee, eBay or other shopping websites, which vend physical products belonging to different product types. The E-commerce website may also refer to an online store of a specific brand, for example, Uniqlo, DELL or other brand online stores, which are online stores vending physical goods of different product types belonging to the same brand. The E-commerce website may also refer to an online shop vending (for downloading) applications/software/digital products, for example, Google Play, iTunes, Steam or App Store, which are E-commerce websites selling digital (virtual) products belonging to different types. For descriptive convenience, in the embodiments that will be described below, the E-commerce website refers to any website selling physical products (e.g., Amazon).

It should be noted that in another embodiment, the decision factors analyzing device 20 may also be integrated into the E-commerce server 10. In this way, in this embodiment, the E-commerce server 10 having the decision factors analyzing device 20 may directly perform a decision factors analyzing operation with respect to product types of products vended by the E-commerce server 10 by using history data (statistics data) collected by itself.

In the present embodiment, the E-commerce server 10 includes a communication circuit unit 110, a processor 120 and a storage device 130. The processor 120 is coupled to the communication circuit unit 110 and the storage device 130. The decision factors analyzing device 20 includes a communication circuit unit 210, a processor 220, a storage device 230 and an input/output (I/O) device 240. The processor 220 is coupled to the communication circuit unit 210, the storage device 230 and the I/O device 240.

In the present embodiment, the communication circuit units 110 and 210 are configured to establish connection between the E-commerce server 10 and the decision factors analyzing device 20 in a wireless communication manner, such that the E-commerce server 10 and the decision factors analyzing device 20 may transmit data to each other or receive data from each other. In the present embodiment, the communication circuit unit 110 or 210 may be a circuit unit having a wireless communication module (which is not shown) and support one of a global system for mobile communication (GSM) system, a personal handy-phone system (PHS), a code division multiple access (CDMA) system, a wireless fidelity (WiFi) system, a worldwide interoperability for microwave access (WiMAX) system, the third-generation wireless communication technology (3G), a long term evolution (LTE) technique, infrared transmission, a Bluetooth communication technique or a combination thereof, which is not limited in the disclosure. In addition, the communication circuit unit 110 or 210 may also be a circuit unit having a wired communication module (which is not shown) transmitting or receiving data in a wired communication manner. The wired communication module may be an optical-fiber network module and establish an optical-fiber network through an optical-fiber interface and an optical fiber, such that the communication circuit units 110 and 210 may be connected with each other. In the established optical-fiber network, the E-commerce server 10 and the decision factors analyzing device 20 may transmit information to each other. The type and the material of the optical fiber is not limited in the disclosure. In addition, the communication circuit units 110 and 120 of the E-commerce server 10 and the decision factors analyzing device 20 may be connected to the Internet before being connected with each other.

In the present embodiment, the storage devices 130 and 230 are configured to store data. The storage devices 130 and 230 may be respectively instructed by the processors 120 and 220 for storing data. The data includes management data respectively employed for managing the E-commerce server 10 and the decision factors analyzing device 20. The storage devices 130 and 230 may be hard disk drives (HDD) of any types or non-volatile memory storage devices.

In the present embodiment, the data stored by the storage device 130 includes a consumer database 131 and a product information database 132. The consumer database 131 is configured to record information of all consumers using the E-commerce website, for example, a plurality of consumer history data respectively corresponding to a plurality of consumers. In the present embodiment, the consumer database 131 includes a browse history database 1311 and a purchase history database 1312.

The browse history database 1311 stores information with respect to webpages and products (pages) of the E-commerce website browsed by all the consumers. Namely, the products/pages browsed by a specific user within a specific period may be searched in the browse history database 1311. The purchase history database 1312 stores information with respect to products purchased by all the consumers from the E-commerce website. Namely, the products purchased by a specific user within a specific period may be searched in the purchase history database 1312.

The product information database 132 is configured to store information with respect to all products and all (product) pages of the E-commerce website. For example, the product information database 132 stores a plurality of product information data. The product information data records, for example, product specification features of products corresponding to the product information data and specification features of webpages (i.e., webpages selling the corresponding products) of products corresponding to the product information data. It should be noted that the webpage and the product page may also refer to any webpage that a browser can open (display) or product page of an application that is opened (displayed) by the application (or APP)/database-program. For example, a seller or an associated user may exhibit (or view) a product via an E-commerce website's webpage or display (or browse) the product via product page of the application/database-program of the E-commerce website.

The data recorded by the storage device 230 includes a plurality of code modules 231 to 233 and a decision factors database 234. The processor 220 may access the code modules 231 to 233 to implement the decision factors analyzing method provided by the disclosure to perform a decision factors analyzing operation corresponding to a product type. The decision factors database 234 is configured to record a plurality of generated sets of decision factors respectively corresponding to different product types.

In the present embodiment, the code modules include a data extraction module 231, a decision factors management module 232 and a regression model management module 233. In another embodiment, the data extraction module 231 and the regression model management module 233 may also be integrated into the decision factors management module 232.

The data extraction module 231 is configured to read a plurality of consumer history data respectively corresponding to a plurality of consumers from the consumer database 131 of the E-commerce server 10 and read a plurality of product information data (PID) from the product information database 132 of the E-commerce server 10. Therein, the consumer history data corresponding to a consumer includes browse history data (BHD) (which is read from the browse history database 1311) and purchase history data (PHD) (which is read from the purchase history database 1312) corresponding to the consumer.

The decision factors management module 232 is configured to manage the overall decision factors analyzing operation performed thereby. The regression model management module 233 is configured to train a regression model.

The processors 120 and 220 are hardware (for example, chipsets or processors) with computation capability configured to respectively manage overall operations of the E-commerce server 10 and the decision factors analyzing device. In the present embodiment, the processors 120 and 220 may be, for example, one-core or multi-core central processing units (CPUs), microprocessors or other programmable processors, digital signal processors (DSPs), programmable controllers, application specific integrated circuits (ASIC), programmable logic devices (PLD) or other similar devices.

The I/O device 240 may be divided into an input apparatus and an output apparatus. Generally, a common input apparatus is, for example, a mouse, a keyboard, a scanner, a digital camera, a digitizer, a microphone, a touch panel or any other apparatus, which allows a user to input data (e.g., query data QD) or control a function to be operated by the user. The output apparatus is, for example, an apparatus, such as a screen (which is employed to receive display data to display a visual content, e.g., an image), a speaker (which is employed to receive audio data to output an audio content, e.g., a sound), but the disclosure is not limited thereto. The input apparatus and the output apparatus may also be integrated together to form, for example, a touch screen capable of data inputting and data outputting. Embodiments accompanying with several figures will be provided to specifically describe interaction among the data extraction module 231, the decision factors management module 232 and the regression model management module 233 and their respective functions.

Figure 2A:
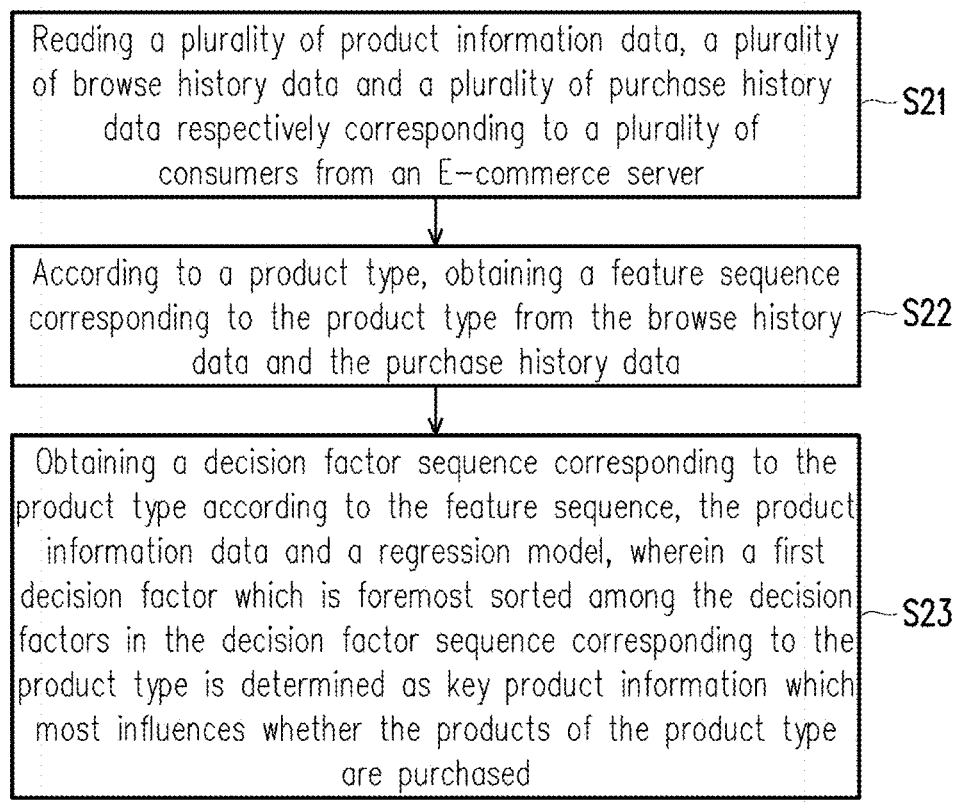
FIG. 2A is a flowchart illustrating a decision factors analyzing method according to an embodiment of the disclosure.

FIG. 2A is a flowchart illustrating a decision factors analyzing method according to an embodiment of the disclosure. Referring to FIG. 1 and FIG. 2A simultaneously, in step S21, the data extraction module 231 reads a plurality of product information data, a plurality of browse history data and a plurality of purchase history data respectively corresponding to a plurality of consumers from an E-commerce server. Specifically, the data extraction module 231, according to an instruction of the decision factors management module 232, reads a plurality of consumer history data respectively corresponding to a plurality of consumers from a consumer database of the E-commerce server of the E-commerce website, and reads a plurality of product information data from the product information database of the E-commerce server. The consumer history data includes the browse history data and the purchase history data respectively corresponding to the consumers.

In the present embodiment, after obtaining all the browse history data and purchase history data, the decision factors management module 232 may, according to input query data QD, selects a product type corresponding to the query data QD from a plurality of product types of all products vended by the E-commerce website to perform a decision factors analyzing operation corresponding to the product type to analyze a plurality of decision factors which cause (products of) the product type to be purchased.

In step S22, the decision factors management module 232, according to a product type, obtains a feature sequence corresponding to the product type from the browse history data and the purchase history data.

Figure 2B:
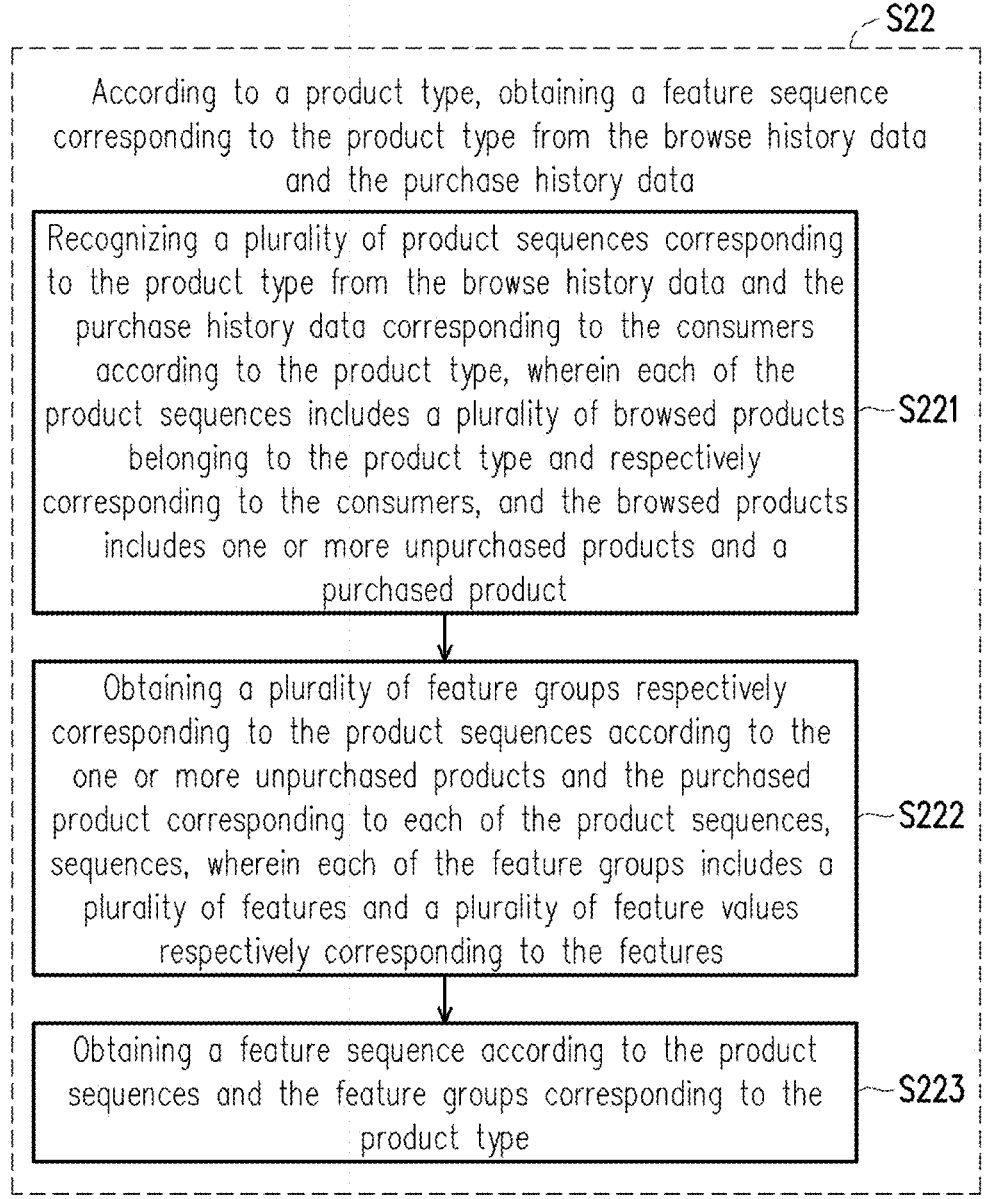
FIG. 2B is a flowchart illustrating step S22 depicted in FIG. 2A according to an embodiment of the disclosure.

FIG. 2B is a flowchart illustrating step S22 depicted in FIG. 2A according to an embodiment of the disclosure. Referring to FIG. 2B, step S22 includes steps S221, S222 and S223. In step S221, the decision factors management module 232, according to the product type, recognizes a plurality of product sequences corresponding to the product type from the browse history data and the purchase history data corresponding to the consumers. Each of the product sequences includes a plurality of browsed products belonging to the product type and respectively corresponding to the consumers. The browsed products include one or more unpurchased products and a purchased product.

Figure 3A:
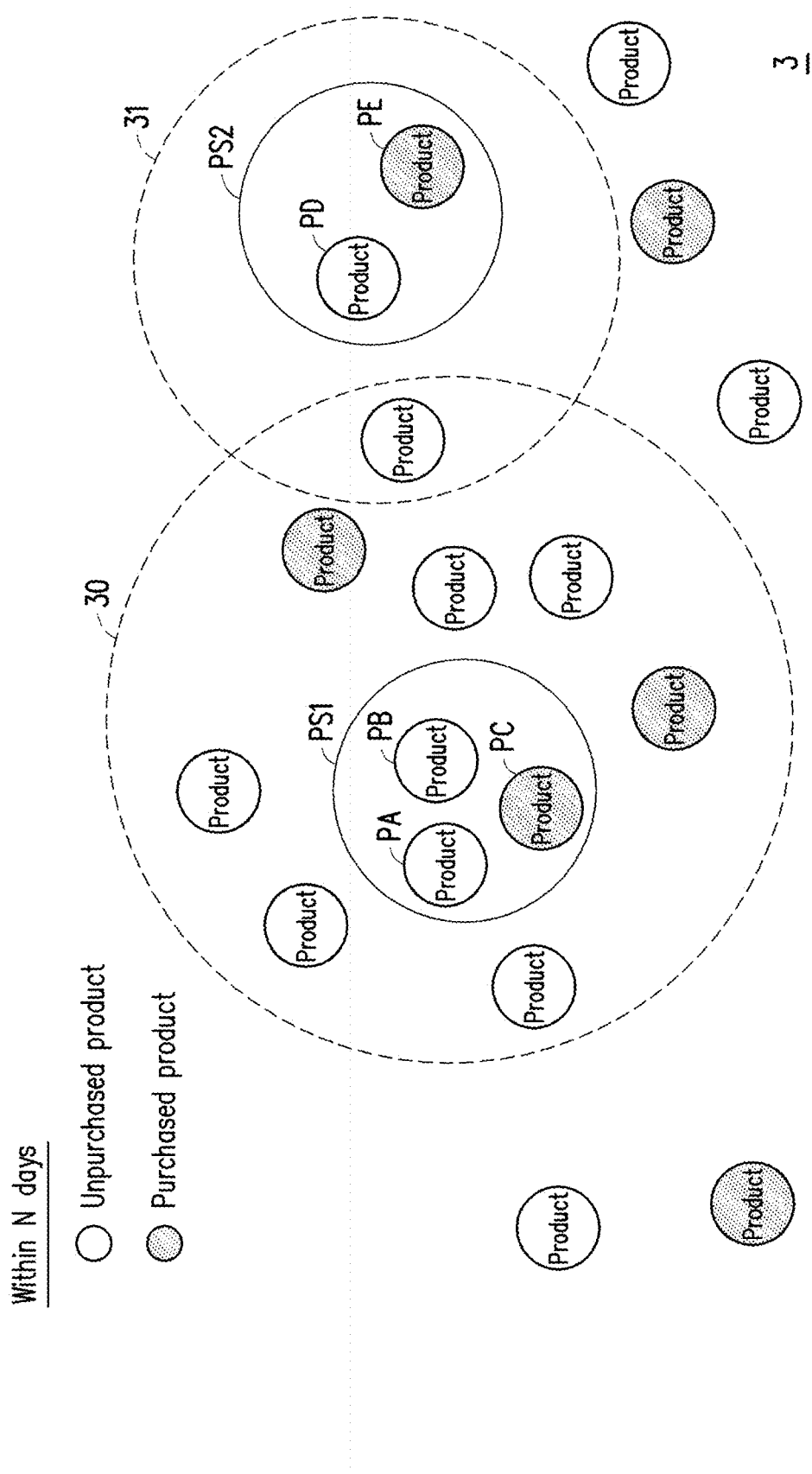
FIG. 3A is a schematic diagram illustrating recognition of product sequences corresponding to a product type according to an embodiment of the disclosure.

FIG. 3A is a schematic diagram illustrating recognition of product sequences corresponding to a product type according to an embodiment of the disclosure. Referring to FIG. 3A, in the present embodiment, the data extraction module 231 may recognize a plurality of browsed products 3 according to a plurality of browse history data within N days (these N days including today) with respect to today (which is also referred to as recently browsed history data) and determine whether the browsed products 3 are purchased (for example, products represented by white circles are unpurchased products (i.e., products which are browsed but not purchased) and products represented by gray circles are purchased products (i.e., products which are browsed and purchased)) according to a plurality of purchase history data within N days with respect to today (which is also referred to as recently purchase history data). Then, the data extraction module 231 recognizes browsed products respectively corresponding to each consumer for each single consumer as a unit. For example, browsed products corresponding to a consumer 30 among the browsed products 3 (i.e., the products inside the dotted circle 30, which represents a plurality of products browsed by the consumer 30 within N days) are recognized, and browsed products corresponding to a consumer 31 among the browsed products 3 (i.e., the products inside the dotted circle 31, which represents a plurality of products browsed by the consumer 31 within N days). In another embodiment, the data extraction module 231 may also, for each consumer as a unit (a unit for recognizing the unit's browsed products and purchased products within these N days), directly recognize/read the products browsed by the each consumer within N days from the browse history data corresponding to the each consumer from the browse history database 1311 and recognize/read the products purchased by the each consumer within N days from the purchase history data corresponding to the each consumer from the purchase history database 1312.

Then, the data extraction module 231 respectively recognizes products belonging to the product type among the products browsed by the consumer 30 (i.e., the products presented in the solid circle PS1, which represent a plurality of products PA, PB and PC belonging to the product type among the products browsed by the consumer 30 within N days) and products belonging to the product type among the products browsed by the consumer 31 (i.e., the products presented in the solid circle PS2, which represent a plurality of products PD and PE belonging to the product type among the products browsed by the consumer 31 within N days). In addition, the data extraction module 231 further recognizes and distinguishes a relationship among the products PA, PB and PC as unpurchased products PA and PB and a purchased product PC according to purchase history data corresponding to the consumer 30. For instance, the data extraction module 231 first recognizes the purchased product PC among the browsed products PA, PB and PC corresponding to the consumer 30 according to recently purchase history data corresponding to the consumer 30, thereby recognizing that the browsed product PC is a purchased product, and, among the browsed products PA, PB and PC corresponding to the consumer 30, those which are not the purchased product PC are the unpurchased products PA and PB, wherein the purchased product PC represents a product which is finally purchased by the consumer 30 by selecting from the browsed products PA, PB and PC after browsing the products PA, PB and PC. Similarly, the data extraction module 231 also recognizes and distinguishes a relationship between products PD and PE as an unpurchased product PD and a purchased product PE according to purchase history data corresponding to the consumer 31.

FIG. 3B illustrates a plurality of recognized product sequences according to an embodiment of the disclosure. Referring to FIG. 3B, following the example set forth above, the data extraction module 231 serves the unpurchased products PA and PB and the purchased product PC of the browsed products PA, PB and PC corresponding to the product type as a product sequence PS1 corresponding to the product type. Similarly, the data extraction module 231 serves the unpurchased product PD and the purchased product PE of the browsed products PD and PE corresponding to the product type as another product sequence PS2 corresponding to the product type. In the same way, the data extraction module 231 may recognize a plurality of product sequences corresponding to the product type from the browse history data and the purchase history data corresponding to the consumers. One or more product sequences may correspond to one consumer. In addition, the data extraction module 231 may also find out a time interval in which the consumers actually compare the products (for example, according to a number of times for browsing products of the same type within a specific time interval), thereby deleting browse records with respect to products whose browse data have been recorded for too long before they are purchased. In an embodiment, the data extraction module 231 also excludes browse records with respect to products which are only purchased without other products being browsed. Namely, the data extraction module 231 also excludes a consumer's behavior of directly purchasing a product without comparing a plurality of products belonging to the product type. In this way, the data extraction module 231 may filter purchasing/browsing behaviors which are not proper for analyzing the decision factors.

After a plurality of product sequences are recognized, referring again to FIG. 2B, in step S222, the decision factors management module 232 obtains a plurality of feature groups respectively corresponding to the product sequences according to the one or more unpurchased products and the purchased product corresponding to each of the product sequences. Each of the feature groups includes a plurality of features and a plurality of feature values respectively corresponding to the features.

To be detailed, taking the product sequence PS1 corresponding to the consumer 30 as an example, the decision factors management module 232 instructs the data extraction module 231 to extract a first product information set corresponding to the purchased product PC (which is also referred to as a first purchased product) according to the read product information data and the product sequence PS1 (which is also referred to as a first product sequence) and extract a second product information set respectively corresponding to the one or more first unpurchased products (i.e., the unpurchased products PA and PB) according to the product information data and the first product sequence PS1. The first product information set has a plurality of different first product information, and each second product information set has a plurality of different second product information.

For instance, the data extraction module 231 may search for product information data corresponding to the purchased product PC in the product information database 132. To be specific, if the product information data is stored according to a specific data structure in the product information database 132, the data extraction module 231 may directly search for product specification data corresponding to the purchased product PC (e.g., product information related to the weight, the price and ingredients of the purchased product PC) and directly search for webpage (or product page) specification corresponding to the purchased product PC (e.g., product information related to the webpage or other than the product specification of the purchased product PC, such as color arrangement of the product webpage, the number of advertisement pictures, the length of description content or whether free shipping is provided).

If the product information data is not stored according to a specific data structure in the product information database 132 (for example, the product information database 132 merely stores webpage data for exhibiting the purchased product PC (which may be semi-structured/unstructured product information data), the data extraction module 231 may extract a plurality of product information related to the purchased product PC from the semi-structured/unstructured product information data corresponding to the purchased product PC from the product information database 132. For example, the data extraction module 231 performs feature extraction on the semi-structured product information data of the purchased product PC to obtain a plurality of corresponding product information. For example, the data extraction module 231 may consider the unstructured product information data of the purchased product PC as a text to obtain a plurality of representative word sets of each product through text mining, the representative word sets are converted into a plurality of binary codes through one-hot encoding, and then, the corresponding product information is recognized according to the binary codes. It should be noted that the disclosure is not intent to limit the method of extracting the product information from the unstructured product information data.

Figure 4:
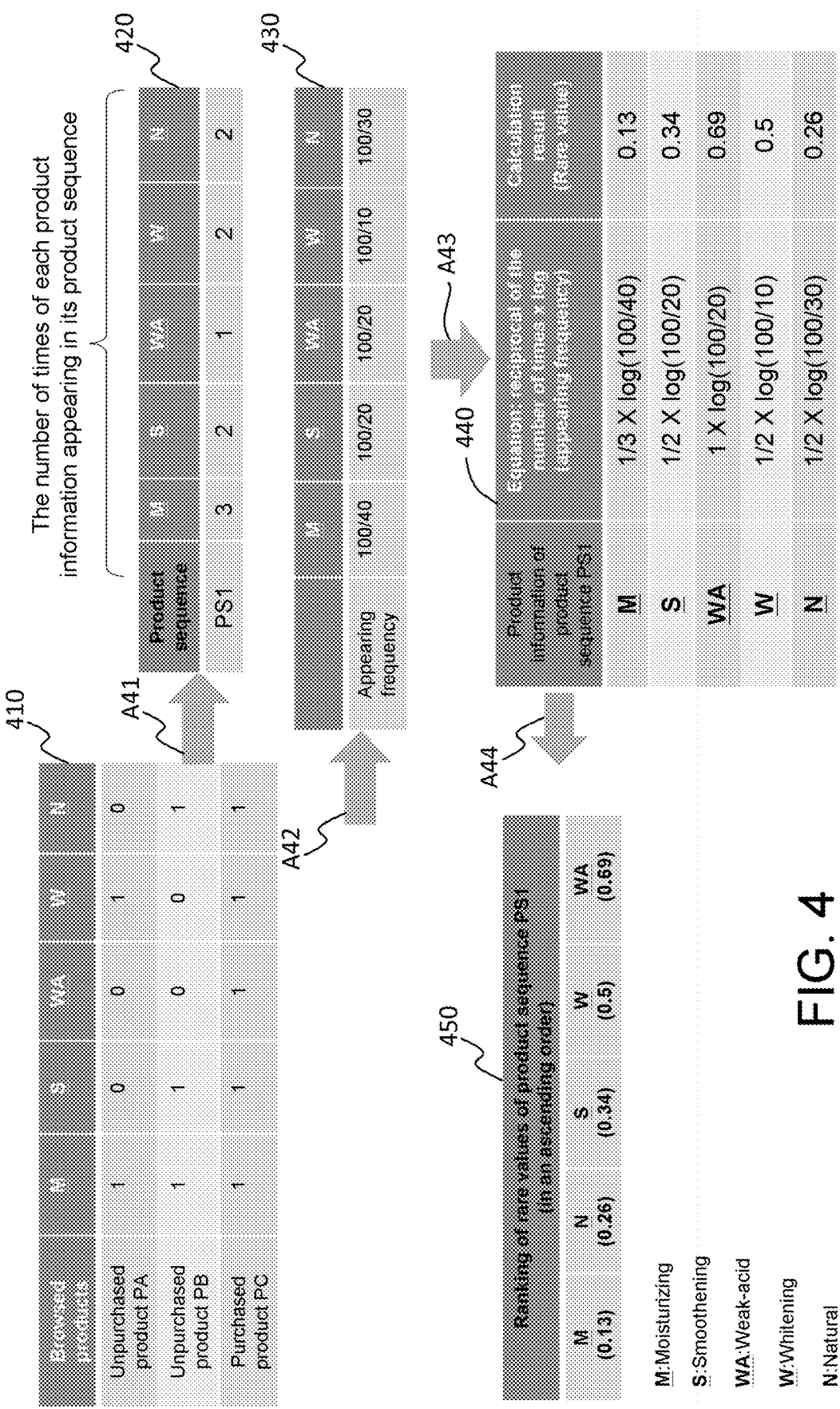
FIG. 4 is a schematic diagram illustrating calculation of rare values according to an embodiment of the disclosure.

FIG. 4 is a schematic diagram illustrating calculation of rare values according to an embodiment of the disclosure. Referring to FIG. 4, (for example, Table 410 as illustrated in FIG. 4), it is assumed that a product type is "body wash", and a product information set (which is also referred to as a first product information set) corresponding to the purchased product PC extracted by the data extraction module 231 is [moisturizing (1), smoothening (1), weak-acid (1), whitening (1), natural (1)] (wherein a bit value "1" is employed to indicate that the product includes the corresponding product information/feature), wherein a plurality of product information (which is also referred to as first product information) respectively includes moisturizing (1), smoothening (1), weak-acid (1), whitening (1) and natural (1). The first product information set is employed to indicate that the purchased product PC has 5 kinds of product information, including moisturizing, smoothening, weak-acid, whitening and natural (which may also be considered as the purchased product PC having 5 kinds of features, including moisturizing, smoothening, weak-acid, whitening and natural). In addition, it is assumed that a product information set (which is also referred to as a second product information set) corresponding to the unpurchased product PA extracted by the data extraction module 231 is [moisturizing (1), smoothening (0), weak-acid (0), whitening (1), natural (0)] (wherein a bit value "0" is employed to indicate that the product does not include the corresponding product information/feature), wherein a plurality of product information (which is also referred to as second product information) respectively are moisturizing (1), smoothening (0), weak-acid (0), whitening (1) and natural (0). The extracted product information set (which is also referred to as the second product information set) corresponding to the unpurchased product PB is [moisturizing (1), smoothening (1), weak-acid (0), whitening (0), natural (1)], wherein the product information (which is also referred to as the second product information) respectively includes moisturizing (1), smoothening (1), weak-acid (0), whitening (0) and natural (1). In other words, the decision factors management module 232, based on the first product information belonging to the purchased product PC, recognizes whether the unpurchased products PA and PB also have the aforementioned first product information. It should be noted that the first product information is considered as a plurality of product information of the product sequence PS1. Namely, the decision factors management module 232 considers the features of the product corresponding to the product sequence PS1 may be represented by the first product information including "moisturizing", "smoothening", "weak-acid", "whitening" and "natural".

After the second product information set corresponding to unpurchased products PA and PB and the first product information set corresponding to the purchased product PC are extracted, the decision factors management module 232 calculates a plurality of rare values respectively corresponding to the first product information by comparing the second product information (i.e., the product information related to the unpurchased products PA and PB) of the second product information set respectively corresponding to first unpurchased products PA and PB with the first product information (i.e., the product information related to the purchased product PC). In other words, the decision factors management module 232 further, according to (1) a number of times of each first product information appearing in the unpurchased products PA and PB and the purchased product PC and (2) a number of times of each first product information appearing in all the products belonging to the product type "body wash", calculates a rare value of each first product information.

To be detailed, in the aforementioned example, the decision factors management module 232 calculates a number of times of each product information appearing in its product sequence (as represented by an arrow A41). For instance, the decision factors management module 232 may organize all the product information corresponding to the unpurchased products PA and PB and the purchased product PC and the corresponding bit values as Table 410. Then, the decision factors management module 232 calculates the number of times of each product information appearing in the product sequence PS1. In the aforementioned example, the product information "moisturizing" appears 3 times (i.e., the unpurchased products PA and PB and the purchased product PC all have the product information "moisturizing"), the product information "smoothening" appears twice (i.e., the unpurchased product PB and the purchased product PC both have the product information "smoothening"), the product information "weak-acid" appears once, the product information "whitening" appears twice, and the product information "natural" appears twice. The decision factors management module 232 then organizes the aforementioned statistical results (as illustrated in Table 420).

In addition, the decision factors management module 232 recognize frequencies of each product information appearing in all the products belonging to the product type (as represented by an arrow A42). For instance, following the aforementioned example, the decision factors management module 232 calculates the frequency of each of the product information "moisturizing", "smoothening", "weak-acid", "whitening" and "natural" extracted from the plurality of product information of all products corresponding to the product type "body wash". For descriptive convenience, it is assumed that the product type "body wash" includes 100 products in total, and among the plurality of product information extracted for the 100 products (among 100 product information sets of the 100 products), the product information "moisturizing" appears 40 times, the product information "smoothening" appears 20 times, the product information "weak-acid" appears 20 times, the product information "whitening" appears 10 times, and the product information "natural" appears 30 times. Accordingly, the decision factors management module 232 calculates (as illustrated in Table 430) that the appearing frequency corresponding to the product information "moisturizing" is 100/40 (which indicates that, every 2.5 (100/40) products, one product would has the product information "moisturizing") (which also indicates that, among 100 products information sets, there are 40 products information sets having the product information "moisturizing"), the appearing frequency corresponding to the product information "smoothening" is 100/20, the appearing frequency corresponding to the product information "weak-acid" is 100/20, the appearing frequency corresponding to the product information "whitening" is 100/10, and the appearing frequency corresponding to the product information "natural" is 100/30.

Then, the decision factors management module 232 may, according to the number of time of each product information appearing in its product sequence and the appearing frequency of each product information appearing in all the products of the product type, calculates a rare value (as represented by an arrow A43). The calculation of the rare values aims at that for the spirit of the disclosure, during the process of the consumer choosing a product as a purchased product, the more times the selected product information appears, the more the consumer concerns about the product information corresponding to the product (should be purchased) (which indicates that such product information is a must selected by the consumer), while the product information with smaller numbers of times for appearance indicates that the importance of the product information with smaller numbers of times is smaller for the consumer. In some scenarios, a product purchased by the consumer among a plurality of browsed products in a product sequence may have a high probability to include a specific product information that is not provided by other unpurchased products (when a specific product information only exists in the purchased product, this specific product information would be considered as valuable and rare). Thus, the rare value of each product information has to be complied as a sequence which is sorted in an ascending order (which may be sorted in a descending order in another embodiment). In addition, the spirit of the disclosure also lies in that rare values of valuable and important product information (which more influences whether this product is purchased by a consumer) would fall within a former section (the rare values are sorted in the front) and a rear section (the rare values are sorted in the rear) in the sequence. Thus, the calculation of the rare values of the disclosure is to obtain a sorted rarity degree sequence and obtain the product information located in the former and the rear sections according to the rare value sequence (by a feature transformation operation). In the calculation of a rare value, a reciprocal of the number of times corresponding to each product information is multiplied by a log value of the appearing frequency of the each product information, and the obtained multiplication product serves as the rare value for the each product information. Following the example set forth above, (as illustrated in Table 440), the calculated rare value corresponding to the product information "moisturizing" is 0.13 (i.e., (1/3)*log(100/40)), the rare value corresponding to the product information "smoothening" is 0.34 (i.e., (1/2)*log(100/20)), the rare value corresponding to the product information "weak-acid" is 0.69 (i.e., (1/1)*log(100/20)), the rare value corresponding to the product information "whitening" is 0.5 (i.e., (1/2)*log(100/10)), and the rare value corresponding to the product information "natural" is 0.26 (i.e., (1/2)*log(100/30)). It should be noted that the disclosure is not intent to limit the calculation of the rare values. For example, in other embodiments, a rare value in another form may also be calculated according to the number of times of one product information appearing in all the products corresponding to a product sequence and the number of times of the product information appearing in all the products belonging to the product type of the E-commerce website by another equation. Such rare value may reflect a relationship between the number of times of the corresponding product information appearing in all the products in the product sequence and the numbers of times of all the products belonging to the product type appearing in the E-commerce website. For example, in other embodiments, the rare value of each product information may also be a multiplication product obtained by directly multiplying the reciprocal of the number of times of each product information in its product sequence by the appearing frequency of the each product information.

The decision factors management module 232 may further sort a plurality of calculated rare values (as represented by an arrow A44). Namely, each of the first product information representing the product sequence PS1 is sorted according to the rare value thereof (as illustrated in Table 450).

After the rare value of each of the first product information is calculated, the decision factors management module 232 may perform a feature transformation operation according to each first product information and the rare value respectively corresponding thereto to transform the rare values into a plurality of first feature values of a first feature group corresponding to the first product sequence. The decision factors management module 232 serves the first product information as a plurality of first features of the first feature group.

Figure 5:
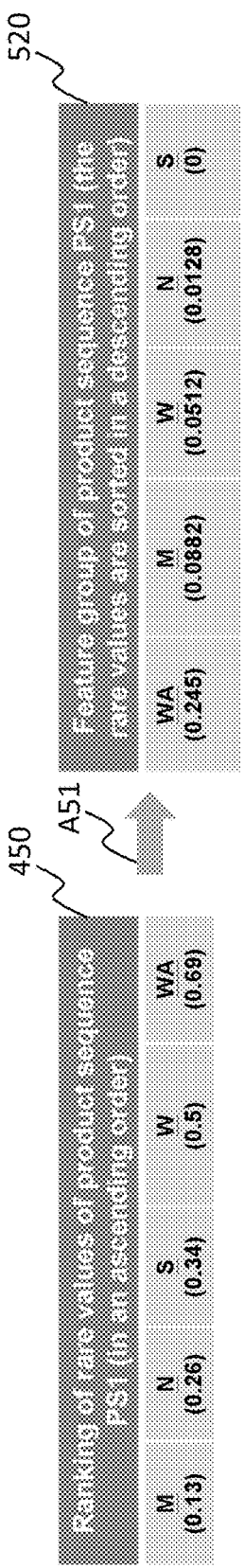
FIG. 5 is a schematic diagram illustrating a feature transformation operation according to an embodiment of the disclosure.
Figure 5:
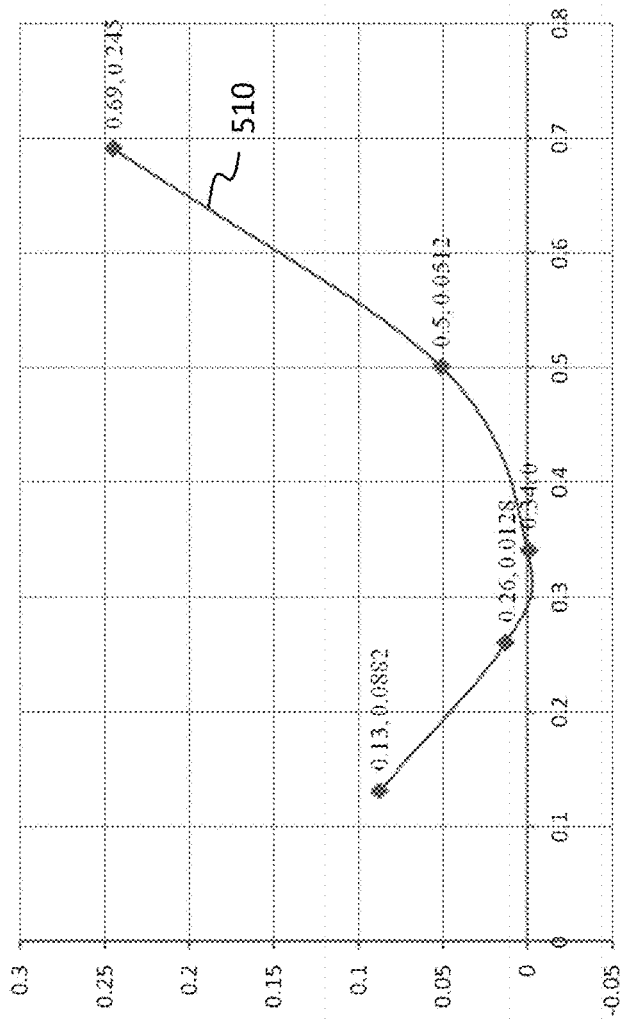

FIG. 5 is a schematic diagram illustrating a feature transformation operation according to an embodiment of the disclosure. After the rare values are calculated, the decision factors management module 232 further performs a feature transformation operation on plurality of rare values corresponding to the first product information of the first product sequence PS1 (for example, represented by an arrow A51) to guess a degree of each of the first product information causing the purchased product PC to be purchased.

To be specific, the decision factors management module 232 transforms a plurality of sorted rare values (as illustrated in Table 450) into the feature values through a curve equation, wherein the feature values transformed from the rare values close to the left and the right sides have larger values, while the feature value transformed from the rare value in the middle has the minimum value. In other words, after the feature transformation operation, the feature value corresponding to the first product information originally sorted in the middle becomes the minimum feature value, and the feature values corresponding to the first product information at the front and the rear ends become the maximum and the secondary maximum feature values. In other words, the spirit of the feature transformation operation lies in guessing that the product information with the minimum rare value must be the essential feature of the product type, and the product information with the maximum rare value corresponds to the feature which most influences whether the products of the product type are purchased. In addition, the product information with the rare value in the middle section corresponds to the feature which is relatively less influential. Therefore, the feature values transformed via the rare values would reflect the foregoing spirit.

Specifically, first, the decision factors management module 232 selects a standard rare value from the rare values, wherein the standard rare value is less than the maximum rare value among the rare values and greater than the minimum rare value among the rare values. For example, the decision factors management module 232 selects the rare value corresponding to the first product information "smoothening" in the middle section as the standard rare value, of which the value is 0.34. In other words, the standard rare value is selected from the rare values in the middle or the secondary middle section.

Then, the decision factors management module 232 serves the standard rare value as a parameter of a curve equation and inputs all the rare values in to the curve equation to output a plurality of feature values (which is also referred to as first feature values) respectively corresponding to the rare values. The standard rare value is transformed into a minimum first feature value among the first feature values, the maximum rare value is transformed into one of a maximum and a secondary maximum among the first feature values, and the minimum rare value is transformed into the other one of the maximum and the secondary maximum among the first feature values. The curve equation includes an output value, an input value, a parameter, a first preset constant and a second preset constant. The output value is obtained by the calculation of the input value, the parameter, the first preset constant and the second preset constant. The step of inputting the rare values to the curve equation to output the first feature values respectively corresponding to the rare values includes setting each of the rare values as the input value and setting the selected standard rare value as the parameter to obtain the output value corresponding to each rare value, wherein the output values respectively corresponding to the rare values are the first feature values respectively corresponding to the rare values.

For instance, referring to FIG. 5, a curve equation (1) for the feature transformation operation in the present embodiment may be:

$$f(y)=B(x-A)^2 \qquad (1)$$

Therein, f(y) represents the output feature value, x represents the input rare value, A represents the selected standard rare value, and B is a preset constant greater than 0 (for example, 2 or any other value greater than 2). In addition, in other embodiments, the number of power of "(x-A)" in the curve equation may also be greater than 2.

Following the aforementioned example (where A=0.34, and B=2), it is assumed that the curve equation is f(y)=2 (x−0.34)$^2$, which is transformed into a curve 510 for the rare values of the first product information corresponding to the product sequence PS1. The abscissa of the curve represents the input rare values, and the ordinate represents the correspondingly output feature values. Namely, through the feature transformation operation, the rare values [0.13, 0.26, 0.34, 0.5, 0.69] of the first product information are respectively transformed into feature values [0.0882, 0.0128, 0, 0.0512, 0.0245] (which are also referred to as the first feature values). In other words, through the feature transformation operation, as illustrated in Table 520, the decision factors management module 232 may obtain a feature group (which is also referred to as a first feature group) corresponding to the product sequence PS1. The first product information "moisturizing", "smoothening", "weak-acid", "whitening" and "natural" becomes the first features of the first feature group and respectively correspond to the transformed first feature values. In the same way, the decision factors management module 232 may obtain a plurality of feature groups respectively corresponding to all the recognized product sequences. It should be noted that the disclosure is not intent to limit the curve equation in the aforementioned example. Persons skilled in the art may design other equations for transforming the rare values into the feature values under the inspiration of the curve equation.

After the product sequences are recognized, referring to FIG. 2B, in step S223, the decision factors management module 232 obtains a feature sequence according to the product sequences and the feature groups corresponding to the product type.

Figure 6:
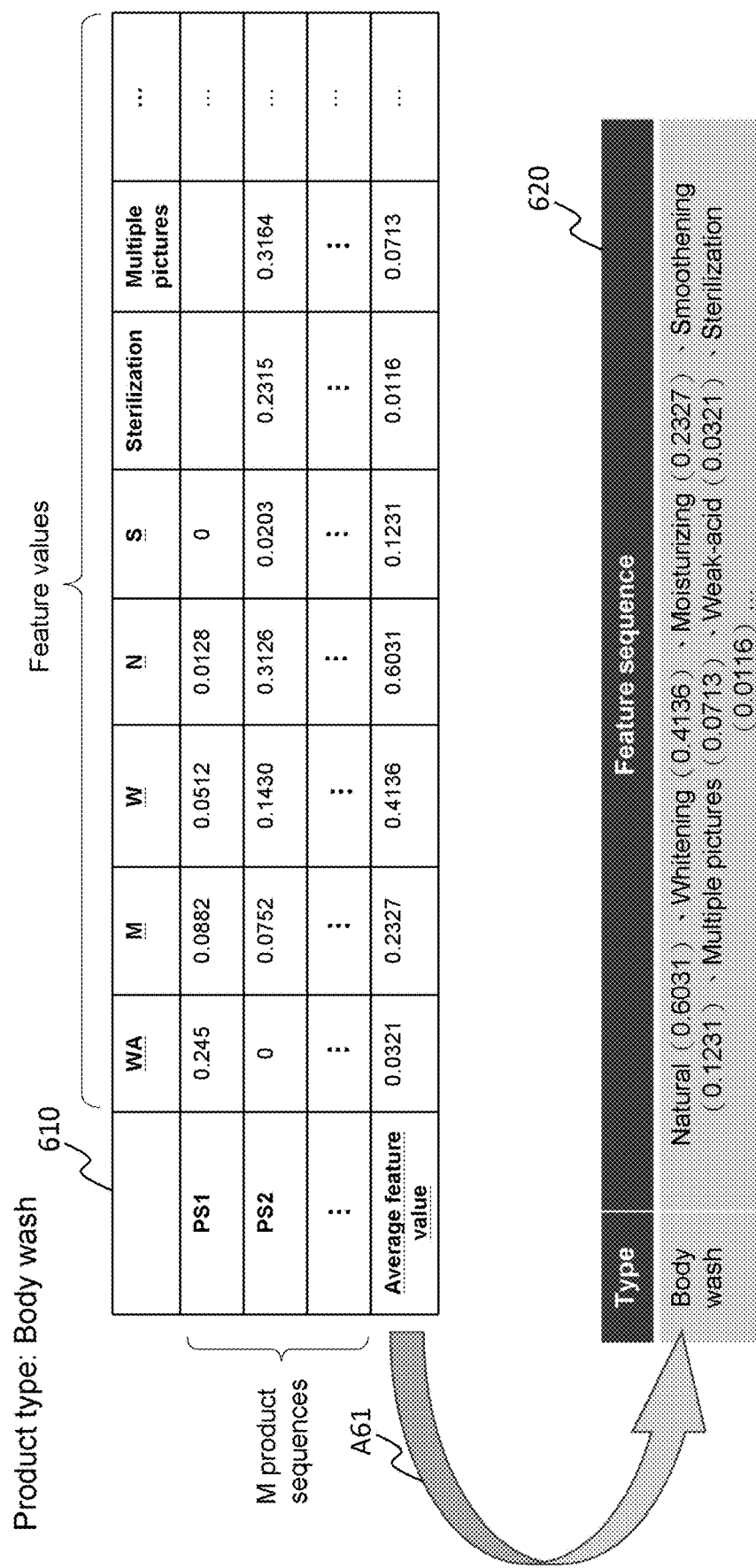
FIG. 6 is a schematic diagram illustrating calculation of a feature sequence according to an embodiment of the disclosure.

FIG. 6 is a schematic diagram illustrating calculation of a feature sequence according to an embodiment of the disclosure. Referring to FIG. 6, it is assumed that there are M product sequences in total corresponding to the product type "body wash", wherein feature groups (and features/feature values belonging thereto) corresponding to a plurality of product sequences PS1, PS2 . . . are illustrated in Table 610. The decision factors management module 232 calculates an average for each feature corresponding to each product sequence. For instance, For the feature "weak-acid", the decision factors management module 232 sums up feature values of the feature "weak-acid" corresponding to the M product sequences (including the product sequence PS1, PS2 . . . PSM) in total and divides the obtained sum by M to obtain an average feature value corresponding to the feature "weak-acid". M is a positive integer.

After the average feature value corresponding to each feature is calculated, the decision factors management module 232 sorts the features corresponding to the product type in a descending order according to the average feature values respectively corresponding to the features (as represented by an arrow A61) to generate the feature sequence (as illustrated in an element 620), for example, [natural (0.6031), whitening (0.4136), moisturizing (0.2327), smoothening (0.1231), multiple pictures (0.0713), weak-acid (0.0321), sterilization (0.0116) . . . ].

It should be noted that in the present embodiment, when a product sequence does not have any feature (nor any feature value corresponding to the feature), the feature value corresponding to the feature of the product sequence is considered as 0 when the calculation operation of the average feature values corresponding to the features is performed. For example, a feature value corresponding to the feature "sterilization" of the product sequence PS1 is set to 0.

After the feature sequence corresponding to the product type is obtained, the decision factors management module 232 further instructs the regression model management module 233 to perform optimization by using a regression model to obtain decision factors corresponding to the product type.

To be specific, returning to FIG. 2A, in step S23, the decision factors management module 232 obtains a decision factor sequence corresponding to the product type according to the feature sequence, the product information data and a regression model, wherein a first decision factor which is foremost sorted among the decision factors in the decision factor sequence corresponding to the product type is determined as key product information which most influences whether the products of the product type are purchased.

Figure 2C:
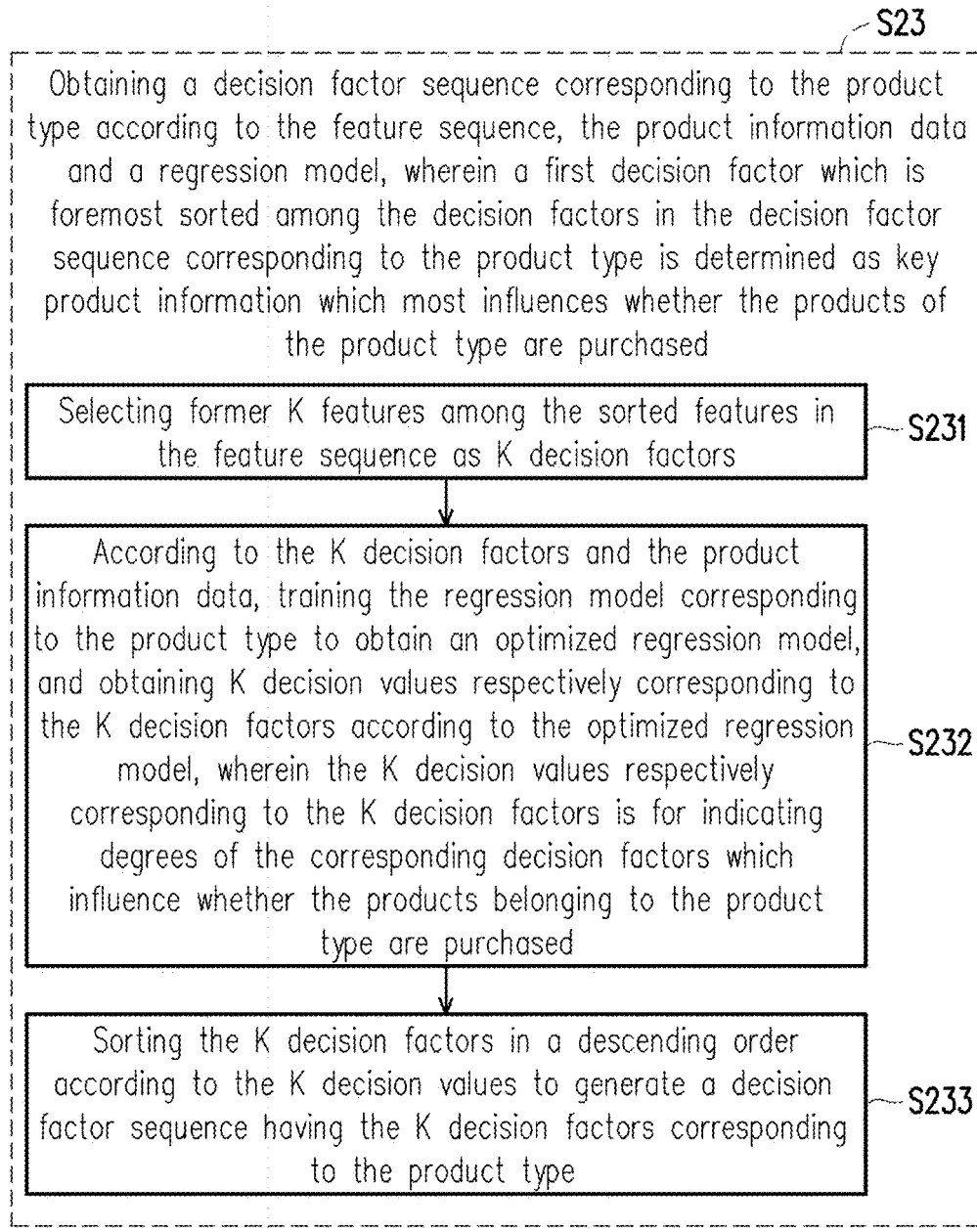
FIG. 2C is a flowchart illustrating step S23 depicted in FIG. 2A according to an embodiment of the disclosure.

FIG. 2C is a flowchart illustrating step S23 depicted in FIG. 2A according to an embodiment of the disclosure. To be detailed, referring to FIG. 2C, step S23 includes steps S231, S232 and S233. In step S231, the regression model management module 233 selects former K features among the sorted features in the feature sequence as K decision factors.

Figure 7:
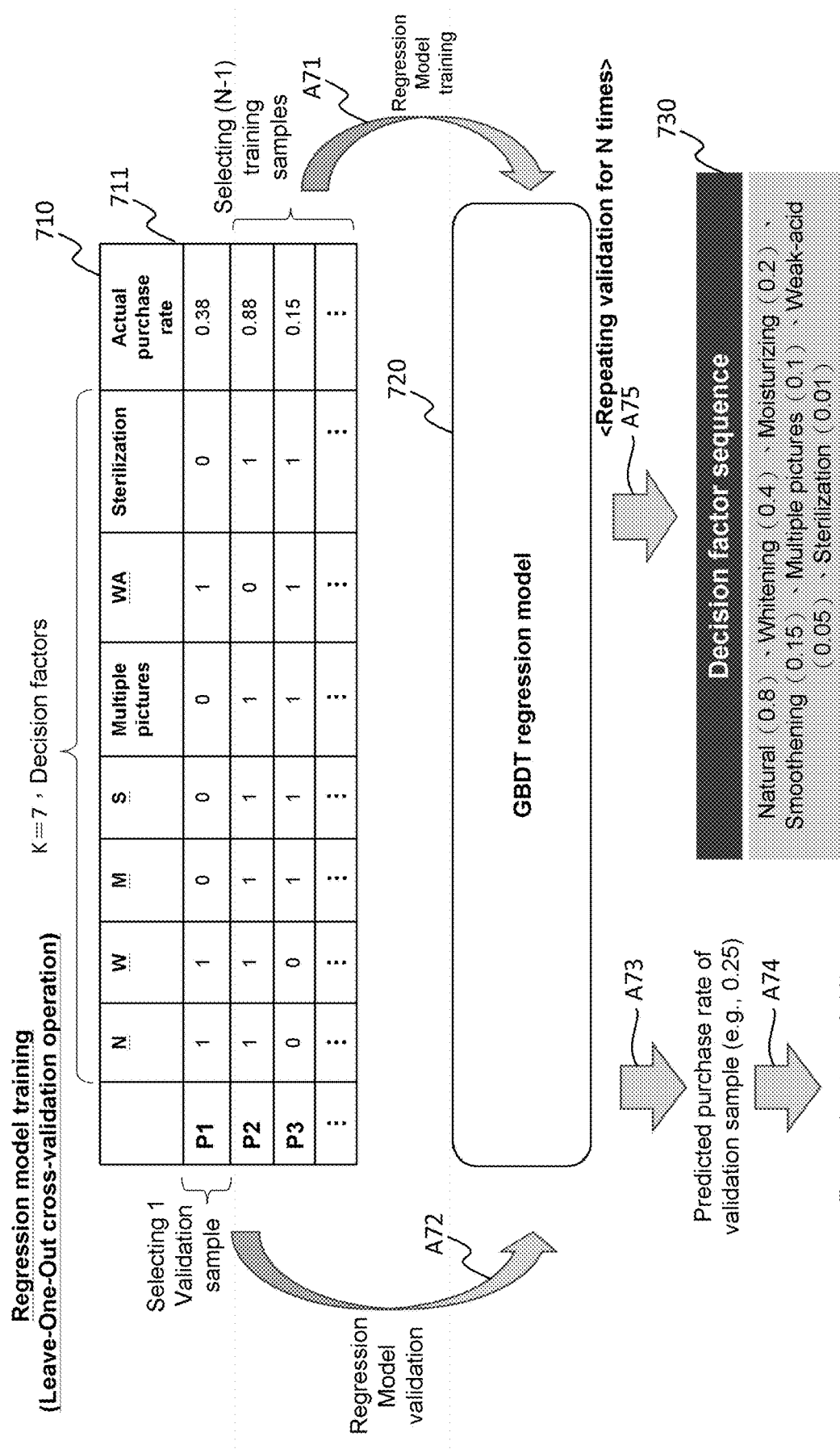
FIG. 7 is a schematic diagram illustrating training of a regression model according to an embodiment of the disclosure.

FIG. 7 is a schematic diagram illustrating training of a regression model according to an embodiment of the disclosure. Referring to FIG. 7, it is assumed that K is set to 7, and as illustrated in the element 620, the feature sequence corresponding to the product type is [natural (0.6031), whitening (0.4136), moisturizing (0.2327), smoothening (0.1231), multiple pictures (0.0713), weak-acid (0.0321), sterilization (0.0116) . . . ]. Accordingly, 7 decision factors selected therefrom are "natural", "whitening", "moisturizing", "smoothening", "multiple pictures", "weak-acid" and "sterilization".

Then, returning to FIG. 2C, in step S232, the regression model management module 233, according to the K decision factors and the product information data, trains the regression model corresponding to the product type to obtain an optimized regression model, and obtains K decision values respectively corresponding to the K decision factors according to the optimized regression model, wherein the K decision values respectively corresponding to the K decision factors are employed to indicate degrees of the corresponding K decision factors which influence whether the products belonging to the product type are purchased.

Specifically, the regression model management module, in step S232, performs a leave-one-out cross-validation operation on the regression model to train/validate the regression model, which includes the following steps step (1) to step (6).

In step (1), the regression model management module 233 calculates actual purchase rates of a plurality of first target products belonging to the product type according to the unpurchased products and the purchased products of the product sequences. A total number of the first target products is greater than or equal to N. In this case, N is a predefined positive integer and used for determining the number of training samples.

To be specific, the regression model management module 233 may calculate an actual purchase rate of each product according to all the purchase history data and browse history data. In the present embodiment, the actual purchase rate of each product is equal to the number of actual purchasing times of the product divided by the number of actual browsing times of the product. For instance, the actual purchase rate of the product PC is the number of total purchasing times of the product PC among all the purchase history data divided by the number of total browsing times among all the browse history data. The regression model management module 233 may calculate the actual purchase rate of each of the products P1, P2, P3 . . . (which are also referred to as first target products) belonging to the product type (as illustrated in an element 710).

In step (2), the regression model management module 233 selects (N−1) second target products from the first target products as training samples and recognizes bit values of the K decision factors of each second target product according to the K decision factors and all the features of each second target product.

To be specific, the number of those among the first target products (which is also referred to as second target products) serving as the training samples for training the regression model is (N−1). Then, the regression model management module 233 may compare all features of each second target product with the 7 decision factors, which are "natural", "whitening", "moisturizing", "smoothening", "multiple pictures", "weak-acid" and "sterilization", (i.e., compare whether each second target product has features same as the 7 decision factors), thereby recognizing the bit values of the 7 decision factors corresponding to each second target product. For example, as illustrated in an element 710, by being compared with the 7 decision factors, the features (i.e., product information) owned by the product P2 include "natural", "whitening", "moisturizing", "smoothening", "multiple pictures" and "sterilization" (each has a bit value "1"), and the feature (i.e., product information) which is not owned by the product P2 is "weak-acid" (which has a bit value "0"). After the bit values corresponding to the 7 decision factors are recognized for all the second target products (e.g., the products P2 to PN), step (3) follows.

In step (3), the regression model management module 233 serves the bit values corresponding to the K decision factors for each of the (N−1) second target products as independent variables corresponding to the each of the (N−1) second target products, serves an actual purchase rate corresponding to the each of the (N−1) second target products as a dependent variable corresponding to the independent variables corresponding to the each of the (N−1) second target products and inputs the independent variables and the dependent variables to the regression model to perform the regression model training (as represented by an arrow A71). In the present embodiment, a gradient boost decision tree (GBDT) regression model 720 is employed to predict a regression model parameter combination having the highest rate of being selected (having highest elected rate). A gradient boost decision tree (GBDT) is a method of predicting an error of the tree through continuous iterations and correcting the error in a gradient direction to generate a next prediction tree. Parameters which may be generally set through the GBDT include the maximum depth of the tree, the maximum number of leaf nodes, the maximum number of sample features and so on. Then, the disclosure is not limited to the use of the GBDT regression model. For example, other regression models which may be applied to the disclosure include a univariate regression model, a multivariate regression model, a random forest regression model, an XGBoost regression model or other suitable regression models. After training by using the (N−1) second target products, the regression model management module 233 performs step (4) to validate whether the trained regression model is an optimized regression model.

In step (4), the regression model management module 233 selects a third target product other than the (N−1) second target products from the first target products as a validation sample for the validation and inputs the bit values of the K decision factors corresponding to the third target product (validation sample) to the regression model to output a predicted purchase rate of the third target product.

For instance, the regression model management module 233 performs a regression model validation operation by selecting the product P1 among the first target products (which is not selected as one of the second target product during this training process) as the third target product and inputting the 7 decision factors corresponding to the product P1 and the corresponding bit values to the trained GBDT regression model 720 (as represented by an arrow A72) to obtain a predicted purchase rate of the validation sample. Namely, the trained GBDT regression model 720 predicts (calculates and outputs) a predicted purchase rate of the validation sample P1 (as represented by an arrow A73) according to the received 7 decision factors of the validation sample P1 and the corresponding bit values.

Then in, step (5), the regression model management module 233 calculates a difference value between the predicted purchase rate and the actual purchase rate of the third target product as an error value (also referred to as error difference) corresponding to the third target product (as represented by an arrow A74). If it is assumed that the predicted purchase rate of the validation sample is 0.25, an error value corresponding to the product P1 may be calculated as 0.13 (i.e., 0.38−0.25) according to the actual purchase rate 711 and the predicted purchase rate corresponding to the product P1.

In an embodiment, the regression model management module 233 compares the obtained error value with a preset error threshold value to determine whether the training of the regression model is completed.

For example, in following step (6), if the error value is less than the error threshold value, the regression model management module determines that the training of the regression model is completed, serves the regression model as the optimized regression model corresponding to the product type and ends the overall operation of training the regression model corresponding to the product type.

If the error value is not less than an error threshold value, the regression model management module re-performs step (2), newly selects the (N−1) second target products which are not totally the same as the previously selected old (N−1) second target products when step (2) is re-performed and so performs in the same way until the obtained error value is less than the error threshold value.

In the present embodiment, if the error value keeps being not converged (i.e., no error value less than the error threshold value is received) after the regression model validation operation is repeatedly performed for N times, the regression model management module 233 may first adjust the value of K (by increasing or decreasing the value of K) and then, re-performs step (2) to step (6). It should be noted that in another embodiment, every time before re-performing step (2), the regression model management module 233 may determine whether to adjust the value of K first and then, re-performs step (2) to step (6).

In another embodiment, the regression model management module 233 repeatedly performs step (1) to step (5) for Q times to obtain Q error values and calculates an average error value of the Q error values and compares the average error value with the error threshold value to perform step (6) according to the comparison result.

In the present embodiment, after the optimized regression model is obtained, the regression model management module 233 obtains K decision values respectively corresponding to the K decision factors according to the optimized regression model. For instance, a decision factor sequence including the K decision factors and the corresponding K decision values may be generated by the completely trained optimized regression model. Then, in step S233, the regression model management module 233 sorts the K decision factors in a descending order according to the K decision values to generate a decision factor sequence having the K decision factors corresponding to the product type. As set forth above, the decision values respectively corresponding to the decision factors are employed to indicate degrees of the corresponding decision factors which influence whether the products (belonging to the product type) would be purchased. Namely, the first decision factor which is foremost sorted among the K decision factors in the decision factor sequence corresponding to the product type is determined as the key product information which influences whether the products belonging to the product type are purchased.

For instance, the regression model management module 233 may read 7 decision values respectively corresponding to the 7 decision factors from the optimized regression model (as represented by an arrow A75) and sort them in a decision factor sequence (which is also referred to as decision factors data DD) as [natural (0.8), whitening (0.4), moisturizing (0.2), smoothening (0.15), multiple pictures (0.1), weak-acid (0.05), sterilization (0.01)] (as illustrated in an element 730). Therein, the decision factor "natural" sorted foremost in the decision factor sequence is the major factor which mainly causes the products belonging to the product type "body wash" to be purchased, and the influence degrees of the other decision factors sorted thereafter which influence whether the products belonging to the product type "body wash" are purchased are descended in order.

In this way, by the decision factors analyzing method and the decision factors analyzing device provided by the disclosure, a plurality of decision factors corresponding to a specific product type can be analyzed, and an importance degree of each of the decision factors (which influence whether the products are purchased) can be obtained.

Inferring by analogy, the decision factors analyzing operation performed by steps S21 to S23 described above, a plurality of decision factor sequences respectively corresponding to the product types of the E-commerce website can be analyzed. In the present embodiment, the decision factors management module 232 stores the decision factor sequence corresponding to each product type in the decision factors database 234. The decision factors database 234 includes a plurality of decision factor sequences respectively corresponding to a plurality of product types. It should be noted that the decision factors database 234 may also store a plurality of optimized regression models respectively corresponding to the product types.

In the present embodiment, the user may also apply the generated/stored decision factor sequences respectively corresponding to a plurality of product types.

Figure 8:
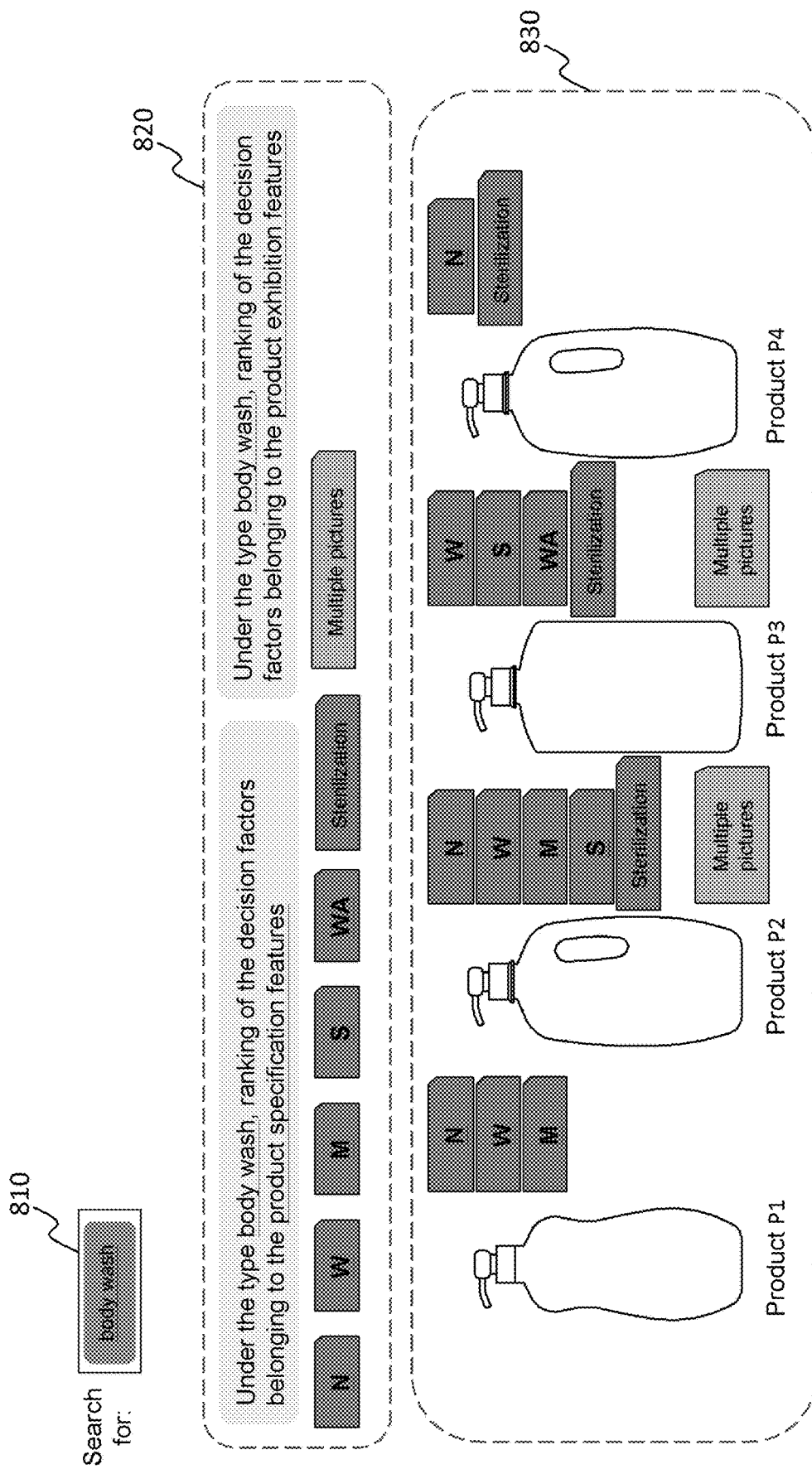
FIG. 8 is a schematic diagram illustrating displaying of a decision factor sequence corresponding to the searched product type according to an embodiment of the disclosure.

FIG. 8 is a schematic diagram illustrating displaying of a decision factor sequence corresponding to the searched product type according to an embodiment of the disclosure. To be specific, the decision factors management module 232 receives a query QD through the I/O device 240, wherein the query QD includes a requested product type, and the decision factors management module 232 looks into the decision factors database 234 for a target decision factor sequence corresponding to the requested product type from the stored decision factor sequences according to the requested product type. The decision factors management module 232 displays a plurality of target decision factors of the target decision factor sequence through the I/O device 240.

For instance, referring to FIG. 8, the decision factors management module 232 may provide a decision factors analyzing interface and display the decision factors analyzing interface through the I/O device 240 (e.g., a touch screen). The decision factors analyzing interface includes a query field 810 which allows the user to input a requested product type (e.g., "body wash") which he/she wants to search for. In response to the input requested product type "body wash", the decision factors management module 232 looks into the decision factors database 234 for the corresponding target decision factor sequence, which is [natural (0.8), whitening (0.4), moisturizing (0.2), smoothening (0.15), multiple pictures (0.1), weak-acid (0.05), sterilization (0.01)], and the decision factors management module 232 displays the target decision factors [natural, whitening, moisturizing, smoothening, multiple pictures, weak-acid, sterilization] through the touch screen (or other kinds of I/O device, such as a display).

In the present embodiment, the target decision factor sequence corresponding to the requested product type may be divided into a first target decision factor sequence corresponding to the product specification features and a second target decision factor sequence corresponding to the product exhibition features. A plurality of first target decision factors of the first target decision factor sequence corresponding to the product specification features belong to product information related to the specifications of the products themselves, and a plurality of second target decision factors of the second target decision factor sequence corresponding to the product exhibition features belong to product information related to the features of the webpages for exhibiting the products of the E-commerce website.

For instance, referring to a region 820 in FIG. 8, among the target decision factors [natural, whitening, moisturizing, smoothening, multiple pictures, weak-acid, sterilization], the first target decision factor sequence corresponding the product specification features includes [natural, whitening, moisturizing, smoothening, weak-acid, sterilization], and the second target decision factor sequence corresponding to the product exhibition features includes [multiple pictures]. Thus, as illustrated in the region 820, the decision factors management module 232 displays the first target decision factors corresponding to the product specification features and the second target decision factor corresponding to the product exhibition feature.

In addition, the user may also directly browse the E-commerce website through the decision factors analyzing interface. When the user browses a product page (as illustrated in region 830) of the E-commerce website through the decision factors analyzing interface, the decision factors management module 232 recognizes exhibited products (e.g., the products P1, P2, P3 and P4) displayed on the product page 830. Then, the decision factors management module 232, according to the read product information data PID and exhibited products P1 to P4, respectively recognizes a plurality of first exhibition product information corresponding to each of the exhibited products P1 to P4. If one or more second exhibition product information among the first exhibition product information corresponding to each of the exhibited products P1 to P4 is the same as one or more of the target decision factors in the target decision factor sequence, the decision factors management module 232 displays the one or more second exhibition product information within regions corresponding to the exhibited products on the product page 830 through the I/O device 240.

For example, the product information (i.e., the second exhibition product information) among all the product information (i.e., first exhibition product information) corresponding to the product P1 same as the target decision factors [natural, whitening, moisturizing, smoothening, multiple pictures, weak-acid, sterilization] include "natural", "moisturizing" and "weak-acid". As illustrated in the element 830, the decision factors management module 232 displays texts of "natural", "moisturizing" and "weak-acid" at the product P1 (e.g., rendered on or near picture of product P1).

In addition, in the present embodiment, the one or more second exhibition product information corresponding to each exhibited product is displayed according to the product specification features and the product exhibition features. For instance, the product information (i.e., the second exhibition product information) among all the product information corresponding to the product P2 which is the same as the first target decision factors [natural, whitening, moisturizing, smoothening, weak-acid, sterilization] corresponding to the product specification features includes "natural", "whitening", "moisturizing", "smoothening" and "sterilization", all the product information (i.e., the second exhibition product information) among all the product information corresponding to the product P2 which is the same as the second target decision factors [multiple pictures] corresponding to the product exhibition features includes "multiple pictures". As illustrated in the element 830, the decision factors management module 232 respectively displays the texts "natural", "whitening", "moisturizing", "smoothening", "sterilization" and "multiple pictures" at the product P2, such that the user may clearly recognize that the product P2 has the decision factors/product information respectively corresponding to the product specification features and the product exhibition features.

In an embodiment, when the query data further includes one or more query product information, the regression model management module 233, according to an optimized regression model (which is also referred to as a requested optimized regression model) corresponding to the requested product type among a plurality of optimized regression models and the one or more query product information, calculates a predicted purchase rate corresponding to the one or more query product information and the requested product type. The decision factors management module 232 displays the predicted purchase rate corresponding to the one or more query product information and the requested product type through the I/O device 240.

Figure 9:
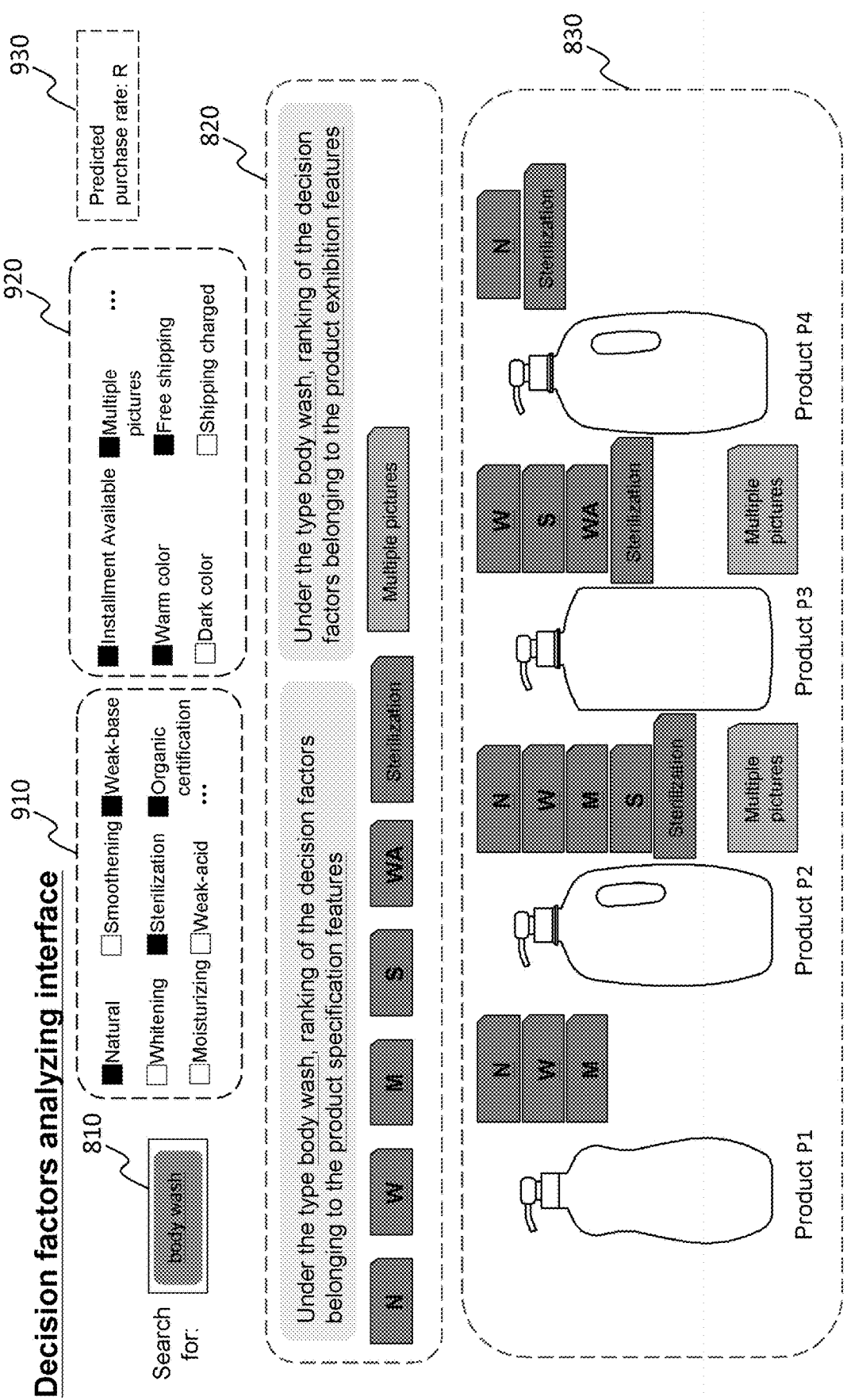
FIG. 9 is a schematic diagram illustrating displaying of a decision factor sequence corresponding to the searched product type and a predicted purchase rate corresponding to a plurality of searched product information according to an embodiment of the disclosure.

FIG. 9 is a schematic diagram illustrating displaying of a decision factor sequence corresponding to the searched product type and a predicted purchase rate corresponding to a plurality of searched product information (e.g., the marked/checked product information in regions 910 and 920) according to an embodiment of the disclosure. Referring to FIG. 9, the decision factors analyzing interface may also provide fields for inputting the one or more query product information. As illustrated in regions 910 and 920, the one or more query product information respectively corresponding to product specification features and the product exhibition features are shown. The user may input a requested product type (e.g., "body wash") to search and select the one or more query product information corresponding to a product to design. And after the user completes the input, the regression model management module 233 looks for an optimized regression model corresponding to the product type "body wash" and instantly inputs the one or more query product information into the optimized regression model to obtain a corresponding predicted purchase rate R. The decision factors analyzing interface may display the obtained predicted purchase rate R corresponding to the one or more query product information and the requested product type (for example, in the element 930). In this way, the user (e.g., a product manager (PM) or a seller) may design the product specifications corresponding to the requested product type and/or the product webpages for exhibiting the product according to the input requested product type, the input query product information and the correspondingly generated predicted purchase rate.

It should be noted that the method of inputting the one or more query product information through the selection operation as illustrated in FIG. 9 is only an example and construes no limitation to the disclosure. For example, in another embodiment, the user may directly input texts of the one or more query product information in the fields configured for receiving the input of the one or more query product information in the decision factors analyzing interface.

In light of the foregoing, in the decision factors analyzing device and the decision factors analyzing method provided by the embodiments of the disclosure, a plurality of product sequences corresponding to a specific product type can be recognized according to a plurality of browse history records and a plurality of purchase history records, which are corresponding to the specific product type, of a plurality of consumers of the E-commerce website, a plurality of decision factors which influence whether the products of the specific product type are purchased are analyzed according to a regression model and a plurality of product information corresponding to the unpurchased and purchased products in the product sequences, and the purchase rate resulted from the one or more product information corresponding to the specific product type can be predicted, such that reference information can be provided for designing products of the specific product type to attract buyers and designing webpages corresponding to the specific product type that attract the consumers to purchase the products. In this way, the relevant persons who sell the products accordingly can further suspend (stop selling) products with lower (predicted) purchase rates (or suspend products having less features for attracting purchase), increasingly launch (start to sell) the products with higher (predicted) purchase rates (or launch products having more features for attracting purchase), and modify marketing strategies and logistics systems toward the specific product type.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A decision factors analyzing device, comprising:
a communication circuit unit, configured to connect with an E-commerce server of an E-commerce website;
a storage device, configured to store a plurality of code modules; and
a processor, configured to access and execute the code modules to perform a decision factors analyzing operation corresponding to a product type, wherein the code modules comprise:
a data extraction module, configured to read a plurality of product information data, a plurality of browse history data and a plurality of purchase history data respectively corresponding to a plurality of consumers from the E-commerce server;
a decision factors management module, configured to manage the decision factors analyzing operation; and
a regression model management module, configured to train a regression model,
wherein the decision factors management module obtains a feature sequence corresponding to the product type from the browse history data and the purchase history data according to the product type,
wherein the decision factors management module obtains a decision factor sequence corresponding to the product type according to the feature sequence, the product information data and the regression model, wherein a first decision factor which is foremost sorted among a plurality of decision factors in the decision factor sequence corresponding to the product type is determined as key product information which mainly influences whether products of the product type are purchased.

2. The decision factors analyzing device according to claim 1, wherein in the operation of the decision factors management module obtaining the feature sequence corresponding to the product type from the browse history data and the purchase history data according to the product type,
the decision factors management module instructs the data extraction module to recognize a plurality of product sequences corresponding to the product type from the browse history data and the purchase history data corresponding to the consumers according to the product type, wherein each of the product sequences comprises a plurality of browsed products belonging to the product type and respectively corresponding to the consumers, wherein the browsed products comprise one or more unpurchased products and a purchased product,
wherein the decision factors management module obtains a plurality of feature groups respectively corresponding to the product sequences according to the one or more unpurchased products and the purchased product of each of the product sequences, wherein each of the feature groups comprises a plurality of features and a plurality of feature values respectively corresponding to the features,
wherein the decision factors management module obtains the feature sequence according to the product sequences and the feature groups corresponding to the product type.

3. The decision factors analyzing device according to claim 2, wherein n the operation of the decision factors management module instructing the data extraction module to recognize the product sequences corresponding to the product type from the browse history data and the purchase history data corresponding to the consumers according to the product type,
the data extraction module, for a first consumer among the consumers, selects first recently browsed history data within N days from first browse history data corresponding to the first consumer and selects first recently purchase history data within the N days from first purchase history data corresponding to the first consumer,
wherein the data extraction module recognizes a plurality of first browsed products corresponding to the product type which are browsed by the first consumer from the first recently browsed history data and recognizes a first purchased product among the first browsed products according to the first recently purchase history data, wherein one or more browsed products other than the first purchased product among the first browsed products are one or more first unpurchased products, wherein the first purchased product represents the product selected from the first browsed products and purchased by the first consumer after browsing the first browsed products,
wherein the data extraction module serves the first purchased product and the one or more first unpurchased products as a first product sequence corresponding to the product type.

4. The decision factors analyzing device according to claim 3, wherein in the operation of the decision factors management module obtaining the feature groups respectively corresponding to the product sequences according to the one or more unpurchased products and the purchased product of each of the product sequences,
the decision factors management module instructs the data extraction module to extract a first product information set corresponding to the first purchased product according to the product information data and the first product sequence and extract second product information sets respectively corresponding to the one or more first unpurchased products according to the product information data and the first product sequence, wherein the first product information set has a plurality of different first product information, and each of the one or more second product information sets has a plurality of different second product information,
the decision factors management module calculates a plurality of rare values respectively corresponding to the plurality of first product information through comparing the second product information of the second product information sets respectively corresponding to the one or more first unpurchased products with the plurality of first product information,
the decision factors management module performs a feature transformation operation according to the plurality of first product information and the corresponding rare values to transform the rare values into a plurality of first feature values of a first feature group corresponding to the first product sequence, wherein the decision factors management module serves the plurality of first product information as a plurality of first features of the first feature group.

5. The decision factors analyzing device according to claim 4, wherein in the operation of the decision factors management module performing the feature transformation operation according to the first product information and the corresponding rare values to transform the rare values into the first feature values of the first feature group corresponding to the first product sequence, the decision factors management module selects a standard rare value from the rare values, wherein the standard rare value is less than a maximum rare value among the rare values and greater than a minimum rare value among the rare values, the decision factors management module serves the standard rare value as a parameter of a curve equation and inputs the rare values to the curve equation to output the first feature values respectively corresponding to the rare values, wherein the standard rare value is transformed into a minimum first feature value among the first feature values, the maximum rare value is transformed into one of a maximum and a secondary maximum among the first feature values, and the minimum rare value is transformed into the other one of the maximum and the secondary maximum among the first feature values.

6. The decision factors analyzing device according to claim 5, wherein the curve equation comprises an output value, an input value, the parameter, a first preset constant and a second preset constant, wherein the output value is obtained by the calculation among the input value, the parameter, the first preset constant and the second preset constant, wherein the operation of inputting the rare values to the curve equation to output the first feature values respectively corresponding to the rare values comprises setting each of the rare values as the input value and setting the selected standard rare value as the parameter to obtain the output value corresponding to the each of the rare values, wherein the output values respectively corresponding to the rare values are the first feature values respectively corresponding to the rare values.

7. The decision factors analyzing device according to claim 4, wherein in the operation of the decision factors management module obtaining the feature sequence according to the product sequences and the feature groups corresponding to the product type, the decision factors management module calculates an average feature value of each of the features according to the features of the feature groups corresponding to the product type and the feature values respectively corresponding to the features, the decision factors management module sorts the features corresponding to the product type in a descending order according to the average feature values respectively corresponding to the features to generate the feature sequence.

8. The decision factors analyzing device according to claim 1, wherein in the operation of the decision factors management module obtaining the decision factor sequence corresponding to the product type according to the feature sequence, the product information data and the regression model, the regression model management module selects former K features among sorted features in the feature sequence as K decision factors, wherein the regression model management module trains the regression model corresponding to the product type according to the K decision factors and the product information data to obtain an optimized regression model and obtains K decision values respectively corresponding to the K decision factors according to the optimized regression model, wherein the decision factors management module sorts the K decision factors in a descending order according to the K decision values to generate the decision factor sequence having the K decision factors corresponding to the product type.

9. The decision factors analyzing device according to claim 8, wherein in the operation of the regression model management module training the regression model corresponding to the product type according to the K decision factors and the product information data to obtain the optimized regression model, the regression model management module performs steps of:

(1) the regression model management module calculates actual purchase rates of a plurality of first target products belonging to the product type according to the unpurchased products and the purchased products of the product sequences, wherein a total number of the first target products is greater than or equal to N;

(2) the regression model management module selects (N−1) second target products from the first target products as training samples and recognizes bit values of the K decision factors of each second target product according to the K decision factors and all the features of each second target product;

(3) the regression model management module serves the bit values of the K decision factors of each second target product among the (N−1) second target products as independent variables and serves the actual purchase rate of each second target product among the (N−1) second target products as dependent variables corresponding to the independent variables to input the independent variables and the dependent variables in the regression model to train the regression model;

(4) the regression model management module selects a third target product other than the (N−1) second target products from the first target products as a validation sample for performing a validation operation and inputting bit values of the K decision factors of the third target product to the regression model to output a predicted purchase rate of the third target product;

(5) the regression model management module calculates a difference value between the predicted purchase rate and the actual purchase rate of the third target product as an error value corresponding to the third target product; and (6) if the error value is less than an error threshold value, the regression model management module determines that the training of the regression model is completed, serving the regression model as the optimized regression model corresponding to the product type and ending the overall operation of training the regression model corresponding to the product type, wherein if the error value is not less than the error threshold value, the regression model management module re-performs step (2) and when step (2) is re-performed, newly selecting (N−1) second target products which are not totally the same as the previously selected old (N−1) second target products.

10. The decision factors analyzing device according to claim 9, wherein before step (2) is re-performed, the regression model management module first adjusts the value of K and then, re-performs step (2).

11. The decision factors analyzing device according to claim 9, wherein the regression model comprises a gradient boost decision tree (GBDT) regression model, a univariate regression model, a multivariate regression model, a random forest regression model or an XGBoost regression.

12. The decision factors analyzing device according to claim 1, wherein the decision factors analyzing device further comprises an input/output (I/O) unit, wherein the decision factors management module stores the generated decision factor sequence corresponding to the product type in a decision factors database, wherein the decision factors database comprises a plurality of decision factor sequences respectively corresponding to a plurality of product types, wherein the decision factors management module receives a query through the I/O unit, wherein the query comprises a requested product type, and the decision factors management module looks into the decision factors database for a target decision factor sequence corresponding to the requested product type from the decision factor sequences according to the requested product type, wherein the decision factors management module displays a plurality of target decision factors of the target decision factor sequence through the I/O unit.

13. The decision factors analyzing device according to claim 12, wherein when a product page of the E-commerce website is browsed, the decision factors management module recognizes an exhibited product displayed on the product page, the decision factors management module recognizes a plurality of first exhibition product information corresponding to the exhibited product according to the product information data and the exhibited product, wherein if one or more second exhibition product information among the first exhibition product information is the same as one or more of the target decision factors of the target decision factor sequence, the decision factors management module displays the one or more second exhibition product information within a region corresponding to the exhibited product in the product page.

14. The decision factors analyzing device according to claim 13, wherein the target decision factor sequence corresponding to the requested product type is divided into a first target decision factor sequence corresponding to product specification features and a second target decision factor sequence corresponding to product exhibition features, wherein a plurality of first target decision factors of the first target decision factor sequence corresponding to the product specification features belong to the product information related to specifications of the products, and a plurality of second target decision factors of the second target decision factor sequence corresponding to the product exhibition features belong to the product information related to features of pages for exhibiting the products of the E-commerce website, wherein in the operation of the decision factors management module displaying the target decision factor sequence through the I/O unit, the decision factors management module respectively displays the first target decision factors and the second target decision factors through the I/O unit, the one or more second exhibition product information are displayed according to the product specification features and the product exhibition features.

15. The decision factors analyzing device according to claim 12, wherein the decision factors database further comprises a plurality of optimized regression models respectively corresponding to the plurality of product types, wherein when the query further comprises one or more query product information, the regression model management module calculates a predicted purchase rate corresponding to the one or more query product information and the requested product type according to a requested optimized regression model corresponding to the requested product type among the optimized regression models and the one or more query product information, wherein the decision factors management module displays the predicted purchase rate corresponding to the one or more query product information and the requested product type through the I/O unit.

16. A decision factors analyzing method, comprising:

reading a plurality of product information data, a plurality of browse history data and a plurality of purchase history data respectively corresponding to a plurality of consumers from an E-commerce server of an E-commerce website;

according to a product type, obtaining a feature sequence corresponding to the product type from the browse history data and the purchase history data; and obtaining a decision factor sequence corresponding to the product type according to the feature sequence, the product information data and a regression model, wherein a first decision factor which is foremost sorted among a plurality of decision factors in the decision factor sequence corresponding to the product type is determined as key product information which mainly influences whether products of the product type are purchased.

17. The decision factors analyzing method according to claim 16, wherein the step of obtaining the feature sequence corresponding to the product type from the browse history data and the purchase history data according to the product type comprises:

recognizing a plurality of product sequences corresponding to the product type from the browse history data and the purchase history data corresponding to the consumers according to the product type, wherein each of the product sequences comprises a plurality of browsed products belonging to the product type and respectively corresponding to the consumers, wherein the browsed products comprise one or more unpurchased products and a purchased product;

obtaining a plurality of feature groups respectively corresponding to the product sequences according to the one or more unpurchased products and the purchased product of each of the product sequences, wherein each of the feature groups comprises a plurality of features and a plurality of feature values respectively corresponding to the features; and obtaining the feature sequence according to the product sequences and the feature groups corresponding to the product type.

18. The decision factors analyzing method according to claim 17, wherein the step of recognize the product sequences corresponding to the product type from the browse history data and the purchase history data corresponding to the consumers according to the product type comprises:

for a first consumer among the consumers, selecting first recently browsed history data within N days from first browse history data corresponding to the first consumer and selecting first recently purchase history data within the N days from first purchase history data corresponding to the first consumer;

recognizing a plurality of first browsed products corresponding to the product type which are browsed by the first consumer from the first recently browsed history data and recognizing a first purchased product among the first browsed products according to the first recently purchase history data, wherein one or more browsed products other than the first purchased product among the first browsed products are one or more first unpurchased products, wherein the first purchased product represents the product selected from the first browsed products and purchased by the first consumer after browsing the first browsed products; and serving the first purchased product and the one or more first unpurchased products as a first product sequence corresponding to the product type.

19. The decision factors analyzing method according to claim 18, wherein the step of obtaining the feature groups respectively corresponding to the product sequences according to the one or more unpurchased products and the purchased product of each of the product sequences comprises:

extracting a first product information set corresponding to the first purchased product according to the product information data and the first product sequence and extracting second product information sets respectively corresponding to the one or more first unpurchased products according to the product information data and the first product sequence, wherein the first product information set has a plurality of different first product information, and each of the one or more second product information sets has a plurality of different second product information;

calculating a plurality of rare values respectively corresponding to the plurality of first product information through comparing the second product information of the second product information sets respectively corresponding to the one or more first unpurchased products with the plurality of first product information; and performing a feature transformation operation according to the plurality of first product information and the corresponding rare values to transform the rare values into a plurality of first feature values of a first feature group corresponding to the first product sequence, wherein the plurality of first product information serves as a plurality of first features of the first feature group.

20. The decision factors analyzing method according to claim 19, wherein the step of performing the feature transformation operation according to the first product information and the corresponding rare values to transform the rare values into the first feature values of the first feature group corresponding to the first product sequence comprises:

selecting a standard rare value from the rare values, wherein the standard rare value is less than a maximum rare value among the rare values and greater than a minimum rare value among the rare values; and serving the standard rare value as a parameter of a curve equation and inputs the rare values to the curve equation to output the first feature values respectively corresponding to the rare values, wherein the standard rare value is transformed into a minimum first feature value among the first feature values, the maximum rare value is transformed into one of a maximum and a secondary maximum among the first feature values, and the minimum rare value is transformed into the other one of the maximum and the secondary maximum among the first feature values.

21. The decision factors analyzing method according to claim 20 wherein the curve equation comprises an output value, an input value, the parameter, a first preset constant and a second preset constant, wherein the output value is obtained by the calculation among the input value, the parameter, the first preset constant and the second preset constant, wherein the operation of inputting the rare values to the curve equation to output the first feature values respectively corresponding to the rare values comprises setting each of the rare values as the input value and setting the selected standard rare value as the parameter to obtain the output value corresponding to the each of the rare values, wherein the output values respectively corresponding to the rare values are the first feature values respectively corresponding to the rare values.

22. The decision factors analyzing method according to claim 19, wherein the step of obtaining the feature sequence according to the product sequences and the feature groups corresponding to the product type comprises:

calculating an average feature value of each of the features according to the features of the feature groups corresponding to the product type and the feature values respectively corresponding to the features; and sorting the features corresponding to the product type in a descending order according to the average feature values respectively corresponding to the features to generate the feature sequence.

23. The decision factors analyzing method according to claim 16, wherein the step of obtaining the decision factor sequence corresponding to the product type according to the feature sequence, the product information data and the regression model comprises:

selecting former K features among the sorted features in the feature sequence as K decision factors;

training the regression model corresponding to the product type according to the K decision factors and the product information data to obtain an optimized regression model and obtaining K decision values respectively corresponding to the K decision factors according to the optimized regression model; and sorting the K decision factors in a descending order according to the K decision values to generate the decision factor sequence having the K decision factors corresponding to the product type.

24. The decision factors analyzing method according to claim 23, wherein the step of training the regression model corresponding to the product type according to the K decision factors and the product information data to obtain the optimized regression model comprises:

(1) calculating actual purchase rates of a plurality of first target products belonging to the product type according to the unpurchased products and the purchased products of the product sequences, wherein a total number of the first target products is greater than or equal to N;

(2) selecting (N−1) second target products from the first target products as training samples and recognizing bit values of the K decision factors of each second target product according to the K decision factors and all the features of each second target product;

(3) serving the bit values of the K decision factors of each second target product among the (N−1) second target products as independent variables and serving the actual purchase rate of each second target product among the (N−1) second target products as dependent variables corresponding to the independent variables to input the independent variables and the dependent variables in the regression model to train the regression model;

(4) selecting a third target product other than the (N−1) second target products from the first target products as a validation sample for performing a validation operation and inputting bit values of the K decision factors of the third target product to the regression model to output a predicted purchase rate of the third target product;

(5) calculating a difference value between the predicted purchase rate and the actual purchase rate of the third target product as an error value corresponding to the third target product; and (6) if the error value is less than an error threshold value, determining that the training of the regression model is completed, serving the regression model as the optimized regression model corresponding to the product type and ending the overall operation of training the regression model corresponding to the product type, wherein if the error value is not less than the error threshold value, re-performing step (2) and when step (2) is re-performed, newly selecting (N−1) second target products which are not totally the same as the previously selected old (N−1) second target products.

25. The decision factors analyzing method according to claim 24, wherein before step (2) is re-performed, the step of training the regression model corresponding to the product type according to the K decision factors and the product information data to obtain the optimized regression model further comprises: first adjusting the value of K and then re-performing step (2).

26. The decision factors analyzing method according to claim 24, wherein the regression model comprises a gradient boost decision tree (GBDT) regression model, a univariate regression model, a multivariate regression model, a random forest regression model or an XGBoost regression.

27. The decision factors analyzing method according to claim 16, further comprising:

storing the generated decision factor sequence corresponding to the product type in a decision factors database, wherein the decision factors database comprises a plurality of decision factor sequences respectively corresponding to a plurality of product types;

receiving a query, wherein the query comprises a requested product type, and looking into the decision factors database for a target decision factor sequence corresponding to the requested product type from the decision factor sequences according to the requested product type; and displaying a plurality of target decision factors of the target decision factor sequence.

28. The decision factors analyzing method according to claim 27, further comprising:

when a product page of the E-commerce website is browsed, recognizing an exhibited product displayed on the product page;

recognizing a plurality of first exhibition product information corresponding to the exhibited product according to the product information data and the exhibited product; and if one or more second exhibition product information among the first exhibition product information is the same as one or more of the target decision factors of the target decision factor sequence, displaying the one or more second exhibition product information within a region corresponding to the exhibited product in the product page.

29. The decision factors analyzing method according to claim 28, wherein the target decision factor sequence corresponding to the requested product type is divided into a first target decision factor sequence corresponding to product specification features and a second target decision factor sequence corresponding to product exhibition features, wherein a plurality of first target decision factors of the first target decision factor sequence corresponding to the product specification features belong to the product information related to specifications of the products, and a plurality of second target decision factors of the second target decision factor sequence corresponding to the product exhibition features belong to the product information related to features of the pages for exhibiting the products of the E-commerce website, wherein the step of displaying the target decision factor sequence comprises:

respectively displaying the first target decision factors and the second target decision factors, the one or more second exhibition product information are displayed according to the product specification features and the product exhibition features.

30. The decision factors analyzing method according to claim 27, wherein the decision factors database further comprises a plurality of optimized regression models respectively corresponding to the plurality of product types, and the method further comprises:

wherein when the query further comprises one or more query product information, calculating a predicted purchase rate corresponding to the one or more query product information and the requested product type according to a requested optimized regression model corresponding to the requested product type among the optimized regression model and the one or more query product information; and displaying the predicted purchase rate corresponding to the one or more query product information and the requested product type.

* * * * *